(12) United States Patent
Hanaoka

(10) Patent No.: US 7,256,900 B1
(45) Date of Patent: Aug. 14, 2007

(54) PRINTERS WITH POSITIONAL SENSORS

(75) Inventor: Masaaki Hanaoka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 742 days.

(21) Appl. No.: 09/649,379

(22) Filed: Aug. 28, 2000

(30) Foreign Application Priority Data

Aug. 31, 1999 (JP) ............................ 11-244384
Jun. 20, 2000 (JP) ............................ 2000-184073

(51) Int. Cl.
G06G 15/00 (2006.01)
G06K 1/00 (2006.01)

(52) U.S. Cl. .................................... 358/1.12; 358/1.15

(58) Field of Classification Search ................ 358/1.1, 358/1.11–1.18, 1.2, 1.9; 709/249, 201, 218
See application file for complete search history.

(56) References Cited

U.S. PATENT DOCUMENTS

| | | | | |
|---|---|---|---|---|
| 4,785,463 | A | * | 11/1988 | Janc et al. .................. 375/147 |
| 5,838,926 | A | * | 11/1998 | Yamagishi .................. 709/249 |
| 6,025,790 | A | * | 2/2000 | Saneyoshi .................. 340/946 |
| 6,204,807 | B1 | * | 3/2001 | Odagiri et al. ......... 342/357.06 |
| 6,246,362 | B1 | * | 6/2001 | Tsubata et al. ........ 342/357.08 |
| 6,707,566 | B1 | * | 3/2004 | Endoh ...................... 358/1.15 |
| 6,829,430 | B1 | * | 12/2004 | Ashizaki et al. ............ 386/117 |
| 2001/0014597 | A1 | * | 8/2001 | Takiguchi et al. .......... 455/343 |
| 2001/0052995 | A1 | * | 12/2001 | Idehara ..................... 358/1.15 |

FOREIGN PATENT DOCUMENTS

| | | | |
|---|---|---|---|
| JP | 05157827 A | * | 6/1993 |
| JP | 6-161685 | | 6/1994 |
| JP | 6-202827 | | 7/1994 |
| JP | 9-6559 | | 1/1997 |
| JP | 9-8821 | | 1/1997 |
| JP | 9-244830 | | 9/1997 |
| JP | 10-126415 | | 5/1998 |
| JP | 10126415 A | * | 5/1998 |
| JP | 11-175267 | | 7/1999 |
| JP | 2000-181664 | | 6/2000 |
| JP | 2000-284925 | | 10/2000 |
| JP | 2001-43173 | | 2/2001 |

OTHER PUBLICATIONS

IBM Technical Disclosure Bulletin, Apr. 1993. Methodology for Geographical Peripheral Access.☐☐*

* cited by examiner

Primary Examiner—Gabriel I. Garcia
Assistant Examiner—Thierry L. Pham
(74) Attorney, Agent, or Firm—Oblon, Spivak, McClelland, Maier & Neustadt, P.C.

(57) ABSTRACT

The technique of the present invention ensures efficient management of printers in a large-scaled network even under a condition that some printer shifts its position on the network. A positioning unit included in each printer connected to the network recognizes positional information, which represents its own geographical position where the printer is located and includes, for example, a latitude and a longitude. Each of computers connected to the network obtains the positional information from each of the printers and specifies a printer, to which print data are output to carry out printing, based on the positional information thus obtained. This arrangement extremely facilitates the management of the printers on the network and enables the user to carry out printing with a selected printer that is located at a desired position.

12 Claims, 14 Drawing Sheets

Fig.3

| Identification Name | IP Address | Positional Information AD |
|---|---|---|
| Sales 1 | 168.192.51.1 | G1,A3,(x1,Y1) |
| Sales 2 | 168.192.51.3 | G1,B5,(x2,y2) |
| General | 168.192.77.51 | G1,C1,(x3,y3) |
| Technical 1 | 255.241.31.36 | G1,D2.(x4,y4) |
| . | . | . |
| . | . | . |
| | | |
| | | |
| | | |

PRINTERS WITH POSITIONAL SENSORS

BACKGROUND OF THE INVENTION

1. Field of the Invention

The present invention relates to a printer that receives print data from a printing control apparatus, such as a computer, and executes printing, as well as a printing control apparatus that is suitably applied for the printer. More specifically the present invention pertains to a technique that selects an optimum printer to execute printing in a system where at least one printer and at least one printing control apparatus are connected via a network.

2. Description of the Related Art

In a system where a plurality of printers are linked on a network, a technique called remote printer is applied to select an arbitrary printer on the network and cause the selected printer to execute printing without directly connecting respective printing control apparatuses, such as computers, with the plurality of printers. The remote printer technique is actualized by a diversity of applications. One possible application connects a computer called a printer server to the network and causes the printer server to collectively manage all the printers on the network. In response to a requirement from each computer, the printer server functions to inform the computer of the identified printers on the network and the working conditions of the respective printers and to cause print data, which represent information to be printed, to be transmitted from the computer to a selected computer.

The conventional remote printer technique generally treats a relatively small-scaled network, for example, on one floor in a building, but does not ensure the sufficient facility in larger-scaled networks. The prior art remote printer technique functionally enables a computer to select an appropriate printer for printing out of a large number of printers connected to the large-scaled network. It is, however, rather inconvenient to use printers on other floors which the user is unfamiliar with, since the user does not know the actual installation positions of the available printers on the network.

One technique proposed to solve such problems, which is disclosed in JAPANESE PATENT LAID-OPEN GAZETTE No. 9-8821, shows a map of an area in which a network is laid, displays printers connected to the network on the map, and enables the user to select an arbitrary printer on the map through an operation of a mouse. The selection of the arbitrary printer with the mouse results in obtaining an identification code, which is used to identify the printer on the network. The print data are output in the form of a packet onto the network, based on this identification code. The printer specified on the map then receives the print data via the network and carries out printing. The technique disclosed in JAPANESE PATENT LAID-OPEN GAZETTE No. 9-8821 to select the desired printer on the map utilizes a printer server as well as a file server, in which the positional information representing the positions where the respective printers are located are stored in the form of a database. The technique retrieves the database in the file server to detect the geographical positions of the available printers and causes the results of the detection to be displayed on the map in the computer.

This technique enables the desired printer for printing to be selected using the map, which is visually and intuitively excellent way for positional detection. The arrangement facilitates the selection of the desired printer for printing and the receipt of the resulting prints. Another proposed technique disclosed in JAPANESE PATENT LAID-OPEN GAZETTE No. 9-6559 stores the location of the printer, that is, the section, the division, and the floor where the printer is located, in the printer itself and causes the printer to respond to a positioning inquiry from the printing control apparatus. The printing control apparatus makes an inquiry prior to printing and selects a desired printer out of available printers displayed on the screen.

The conventional remote printer technique, however, collectively manages the database and thereby has difficulties in management and service of the system. The network manager needs to register the positions of all the printers individually in the database. This requires much labor of the network manager when a large number of printers are connected to the network. In the actual state, the user sometimes changes the physical position of the printer that is connectable with the network. The position of the printer may not be significantly changed if the printer is moved under the connection to the network. The printer connectable with the network, however, can be connected at any place with a connection node, for example, a hub in the Ethernet. It is thus highly possible that the printer may be moved to another floor, another building, or another office in a large-scaled network.

Moving the printer changes the physical position of the printer, so that the network manager should carry out the registration in the database over again every time the physical position of the printer is changed. This requires much labor and time for the management. Similar problems arise in the arrangement where the user of each printer carries out the registration. The insufficient management of the positions of the respective printers may cause the user who has selected a desired printer for printing on the map not to find the desired printer at the registered position, and may require much time and labor for the user to receive the resulting prints. The centralized management of the positions of the respective printers by a management section, on the other hand, does not allow the flexible change of the layout on each floor. Specification of the position of the printer by the name of the building or by the name of the section or the division is rather inconvenient in the event of reorganization or restructuring.

In the case of the centralized management of the positions of the printers by the management section, the network manager collectively and systematically manages the layout of the printers as well as the printer server and the file server. Each user of the printing control apparatus or the printer is accordingly required to make an application for connection of the printing control apparatus or the printer to the network and receive a permission or an approval. This series of procedure is rather complicated. In order to relieve the complicatedness of the procedure, some improvement has introduced in the printer, and the technique has been developed to automatically transmit the printable description languages and the conditions of the printer to the printer server via the network. Such improvement and development are, however, not sufficient for the efficient use of the plurality of printers connected to the large-scaled network as discussed previously. Since the prior art remote printer technique collectively manages the installation positions of the respective printers, the user of each printer connected to the network should cancel the previous positional information and make an application for a new installation position every time when the position of the printer is changed. Such information should be added to the database stored in the file server. This applies the excess loading to the network manager.

There is a directory service on the network, which obtains information with regard to a plurality of printers and printing control apparatuses and supplies the information in response to a requirement. When the computer connected to the network asks for the available resources, for example, available printers, on the network, the directory service retrieves the database and provides information with regard to the available printers. The directory service is based on the technique that allocates an intrinsic name or an identification code, for example, an IP address in the case of the network according to a TCP/IP protocol, to each printer connected to the network and specifies each printer with the unique identification code, that is, the IP address. The directory service, however, does not inform the user of the position of the printer, for example, which is closest to the computer that requires printing.

With a development of mobile computing, there is a fair possibility that the user connects a portable computer to the network in an unfamiliar place to carry out printing with a printer closer to the connection site. It is, however, extremely troublesome to obtain the information regarding which printer is the closest. In the case where a certain model of printer is specified as the standard printer of the computer and is recognizable via the network, printing may be carried out with the certain model of printer that is far away from the connection site. For example, it is assumed that remote offices in a company keep connection via a private line according to the TCP/IP protocol and a sales representative who goes from a home office to a remote office for a meeting connects a portable computer to the network and gives a printing instruction. In this case, the portable computer recognizes the same printer model as the one that is generally used in the home office, via the network and causes printing to be carried out with the recognized printer, even if the recognized printer is far away from the connection site.

Such troubles are observed more frequently with a development of the environment allowing a variety of resources, such as printers and scanners, to be utilized via the network. In one possible application, a high-performance printer, such as a color laser printer or a PostScript laser printer, is installed in a convenience store. The user gives a printing instruction from a computer at home to the high-performance printer and picks up the resulting prints in the middle of commuting. This possible application is, however, not practical so far since it is difficult to specify printers that are present in the route of commuting.

SUMMARY OF THE INVENTION

The object of the present invention is thus to provide a technique that enables a user or an apparatus to utilize any of printers connected to even a large-scaled network without applying any additional load to a network manager.

At least part of the above and the other related objects is actualized by a printer that is capable of data transmission via a network and receives print data to carry out printing. The printer includes: a positioning unit that recognizes positional information representing a geographical position where the printer is located; and a positional information output unit that outputs the recognized positional information representing the geographical position via the network.

In the printer of the present invention having the above configuration, the positioning unit recognizes the positional information representing the geographical position where the printer is located. The positional information representing the geographical position of the printer is output via the network. This arrangement enables a user or an apparatus that requires use of a printer on the network to readily obtain the positional information representing the geographical position of the printer. Utilizing the positional information representing the geographical positions of respective printers enables, for example, a printer geographically closest to the user to be specified and used for printing. The condition for selecting an appropriate printer is not restricted to the 'geographically closest' printer but is specified according to requirements. For example, the condition may be a printer along a route of commuting or a printer that is located in A town, B city. The 'positional information representing the geographical position' where the printer is located is not organization-oriented information like 'P section, Q division' but is information that enables the location of the printer to be specified geographically, for example, a combination of a latitude and a longitude or coordinates representing a certain position in a specified fundamental map like a map of national topographic series.

The technique of the present invention does not require the network manager to grasp positions of all the printers connected to the network and thus significantly reduces the loading on the management. Each printer on the network has the positional information representing its geographical position. This arrangement effectively prevents potential troubles, for example, missing of prints, due to forgetting to change the positional information of the printer that is shifted to another location.

In accordance with one preferable application of the printer, the positioning unit includes: a positional information input unit that inputs the positional information representing the geographical position where the printer is located; and a storage unit in which the positional information input from the positional information input unit is stored. In this application, the user of each printer may input the positional information representing the geographical position of the printer. Manually inputting the positional information requires some labor of the user. But the user inputs the positional information at the location where the printer is actually present. Such work is far easier than the work of the manager who collectively inputs and manages the positional information at a place apart from the actual location of the printer, for example, at a management center. This arrangement also effectively reduces omission of modification or wrong input of the positional information when the printer is shifted to another location, thus ensuring the high utility of the printer connected to the network.

A diversity of methods are applicable to input the positional information representing the geographical position where the printer is located. One method provides a number of maps including area maps and detailed maps to select the position where the printer is located on these maps. Another method directly inputs the address of the location where the printer is present. Still another method inputs another piece of information representing the location of the printer, for example, a zip code, a telephone number, or a name of a railway or subway station or a bus stop that is closest to the location of the printer.

In accordance with another preferable application of the printer, the positioning unit includes a positional information obtaining unit that obtains the positional information representing the geographical position as a result of positioning by a positioning system integrally or temporarily connected therewith. In this structure, the positional information representing the geographical position is automatically obtained. With each shift of the printer, the positional information of the printer is automatically updated. The positioning system may always be activated. But since it is rather rare to change the position of the printer so often, the positioning system may be connected at preset intervals, for example, once a month. The positioning system may alternatively be connected only when the printer is moved. A detachable positioning system may otherwise be used and connected to the printer for recognizing the geographical position of the printer, when the printer is installed or moved.

One example of the positioning system is a GPS (global positioning system) that obtains the positional information representing the geographical position by utilizing a phase difference between microwaves sent from at least three satellites. The GPS system is available on the whole globe and thus constructs a positioning system of extremely high usability. Another example of the positioning system is a D-GPS (differential global positioning system) that has approximately 10-fold accuracy by adding error information from fixed reference stations to the generally known GPS. Such systems have already been adopted in car navigation systems and can utilize not only two-dimensional positional information (latitude and longitude) but three-dimensional positional information including altitude data. Namely the obtained positional information specifies the floor of a building. Still another example of the positioning system communicates with at least one out of a plurality of fixed ground stations to obtain the positional information representing the geographical position. The accuracy of the positional information may be enhanced by a combination of these systems. Another example mounts the printer on a table with casters and corrects the obtained positional information representing the geographical position with a moving distance and a moving direction. Here the moving distance is defined by the number of rotations of the casters and the moving direction is measured with, for example, a gyroscope.

In accordance with still another preferable application of the printer, the positional information output unit may receive a positioning instruction sent from a specific device via the network and output the recognized positional information representing the geographical position to the specific device. The specific device outputting the requirement for the positional information analyzes the input positional information and readily specifies the printer having a predetermined positional relation, for example, the printer close to the specific device. The printer may alternatively output the positional information at fixed time intervals or at the time point when the printer is connected to the network.

In accordance with one preferable embodiment, the printer may be constructed to detect a displacement of the position of the printer and activate the positioning unit to carry out the recognition of the positional information representing the geographical position where the printer is located, in response to a detection of the displacement of the position. The displacement of the position may be detected, for example, by rotations of casters directly attached to the printer or to the table on which the printer is mounted. The displacement of the position may alternatively be detected by taking advantage of the technique of monitoring a moving object with a personal handy-phone system or a mobile communication system. This arrangement enables the positional information to be updated every time the printer is moved, and thus effectively prevents the printing operation from being carried out based on the wrong positional information.

In accordance with another preferable embodiment, the printer may activate the positioning unit to carry out the recognition of the positional information representing the geographical position where the printer is located, in response to a power supply through an operation of a power switch. This arrangement enables the geographical position to be recognized on every occasion of power supply, thereby favorably updating the positional information prior to the use of the printer.

In accordance with still another preferable embodiment, the printer may activate the positioning unit to carry out the recognition of the positional information representing the geographical position where the printer is located, in response to input of a positioning command sent from another apparatus via the network. This arrangement preferably enables the positional information to be recognized at desired timings.

In accordance with another application of the printer, when the input print data includes the positional information representing the geographical position, it is determined whether or not the input print data are to be printed by the printer, based on the positional information. Printing is carried out with the input print data when it is determined that the input print data are to be printed by the printer. In the case where the positional information representing the geographical position is attached to the print data, the apparatus that gives a printing instruction is not required to specify the printer used to print the print data but needs to simply output the print data onto the network.

On the premise of the presence of the printer discussed above, the technique of the present invention is actualized by an apparatus that controls printing. The present invention is accordingly directed to a first printing control apparatus that is capable of data transmission to and from at least one printer via a network and outputs print data via the network, so as to cause a printer selected out of the at least one printer to carry out printing. The first printing control apparatus includes: a positional information obtaining unit that obtains positional information representing a geographical position where each of the at least one printer is located, from the each printer via the network; a printing condition input unit that inputs a geographical condition of a printer of interest, which is to be selected to carry out printing, in the process of outputting the print data; a printer specification unit that specifies a printer, to which the print data are to be output, based on the obtained positional information and the input geographical condition; and a print data output unit that outputs the print data to the specified printer via the network.

The present invention is also directed to a method of printing, which corresponds to the first printing control apparatus discussed above. The method transmits data to and from at least one printer via a network and outputs print data via the network, so as to cause a printer selected out of the at least one printer to carry out printing. The method includes the steps of: obtaining positional information representing a geographical position where each of the at least one printer is located, from the each printer via the network; inputting a geographical condition of a printer of interest, which is to be selected to carry out printing, in the process of outputting the print data; specifying a printer, to which the print data are to be output, based on the obtained positional information and the input geographical condition; and outputting the print data to the specified printer via the network.

In the first printing control apparatus and the corresponding method, the positional information representing the geographical position of each printer is obtained from the respective printers. The geographical condition of the printer of interest, which is to carry out printing, is input in the process of outputting the print data. The printer, to which the print data are to be output, is specified, based on the positional information and the geographical condition. The print data are then output to the specified printer via the network. This arrangement enables printing to be carried out, for example, with a closest printer by simply inputting the geographical condition of the printer of interest, for example, the printer closest to the printing control apparatus. This significantly improves the facilities of the printing control apparatuses and the printers connected to the network. The positional information representing the geographical position of each printer is obtained from the respective printers. The network manager is thus not required to manage the positional information of all the printers on the network. This drastically reduces the labor of the network manager for management and service.

The geographical condition may pinpoint a specific printer. In general use, however, there is an allowable range of printers, for example, printers within several meters in radius from the user. It is accordingly practical to set an allowable range of available printers that have the positional information satisfying the input geographical condition. The printer, to which the print data are to be output, is then specified by taking into account the allowable range.

The allowable range may be set, for example, as a predetermined area deviating from the geographical condition of the printer of interest that is to be selected to carry out printing, as a certain type of printers close to the printing control apparatus, or as any types of printers close to the printing control apparatus.

It is also practical to set the allowable range as a predetermined area from the geographical position of the printing control apparatus, instead of the area with regard to the printer of interest. In this case, the printing control apparatus has means for recognizing positional information representing a self geographical position where the printing control apparatus is located.

The allowable range may be set as an upper limit of a number of printers meeting the input geographical condition. In the event that there are several tens printers satisfying the input geographical condition, the extremely large number of options makes the selection rather difficult. In this case, restriction to a preset number improves the convenience of selection. The selectable range of printers may be restricted according to a preferential order allocated in advance to the respective printers or at random. The restriction may be based on a diversity of other conditions, for example, the alphabetical order of names allocated to the respective printers or the performances of the respective printers. Regardless of the restriction of the number of printers, it is desirable to display the available printers in a selectable manner. Even when the available printer is only one, a preferable procedure displays the available printer for confirmation by the user of the printing control apparatus and then shifts to the actual printing process. The available printers may be displayed simply with the names allocated to the respective printers on the network or in a specific manner that utilizes the positional information of the printers to reflect the relative geographical positions of the respective printers. The display reflecting the relative positions of the printers, for example, in a map preferably enables the user to select a desirable printer on the display.

In accordance with one preferable application of the present invention, the first printing control apparatus further includes a self positioning unit that recognizes positional information representing a self geographical position where the printing control apparatus is located. The positional information obtaining unit stores therein a table that represents a mapping of the positional information representing the geographical position of each printer to identification information used to identify the each printer on the network. The printer specification unit specifies a printer, which is to carry out printing on the network, based on the input geographical condition and the positional information representing the self geographical position of the printing control apparatus. The print data output unit obtains the identification information with regard to the specified printer by referring to the table stored in the positional information obtaining unit, and outputs the print data in the form of a predetermined packet using the obtained identification information.

The printing control apparatus of the above configuration stores the mapping of the positional information representing the geographical position of each printer to the identification information of the each printer in the form of a table. This arrangement facilitates the specification of the printer, which satisfies the input geographical condition, on the network. The printing control apparatus utilizes the identification information and outputs the print data in the form of a predetermined packet to the network. This ensures transmission of the print data to the printer of interest that is selected to carry out printing.

In accordance with one preferable embodiment, a condition of geographically close to the printing control apparatus may be input as the geographical condition of the printer of interest that is to be selected to carry out printing. In this embodiment, the printer specification unit refers to the table and specifies at least one printer that is close to the printing control apparatus on the network. In many cases, printing with the printer closest to the user is the most convenient for the user. It is accordingly preferable that the printer geographically close to the printing control apparatus is stored as a default condition in the system. It is also preferable that an option of 'geographically close printer' is added to a dialog box to give a printing instruction.

In the arrangement of specifying the printer based on the input geographical condition, there may be only one printer or a plurality of printers that satisfy the geographical condition input by the printing condition input unit. Even if there is only one printer satisfying the input geographical condition, in some cases, confirmation is needed to ask whether the user requires the printer to carry out printing. One applicable procedure displays positional information representing geographical positions of available printers on the network, which meet the geographical condition input by the printing condition input unit, selects one printer out of all the available printers having the positional information displayed, and specifies the selected printer as the specified printer, to which the print data are to be output. In the case where the input geographical condition is ambiguous like 'the available printer of as close as possible' or 'the printer in this building', all the printers satisfying the input condition are displayed with the positional information representing the geographical positions of the respective printers. The user then selects the optimum printer on the display. This arrangement improves the facility of the printing control apparatus. The positional information representing the geographical positions of the respective printers may be displayed in the form of description or in a graphical manner using a map.

The present invention is further directed to a second printing control apparatus that is capable of data transmission to and from at least one printer via a network and outputs print data via the network, so as to cause a printer selected out of the at least one printer to carry out printing.

The second printing control apparatus includes: an inquiry unit that obtains positional information representing a geographical position, where each of the at least one printer is located, from the each printer via the network and makes an inquiry to a resource storage unit that stores therein a table, which represents a mapping of the positional information representing the geographical position of each printer to identification information used to identify the each printer on the network; a printer specification unit that causes the inquiry unit to make the inquiry to the resource storage unit and specifies a printer, to which the print data are to be output, in response to an input of a geographical condition of a printer of interest that is to be selected to carry out printing; and a print data output unit that outputs the print data to the specified printer via the network.

The second printing control apparatus having the above configuration does not itself carry out the management of resources, such as printers, on the network, but uses the resource storage unit that stores the relationship between the positional information of the resources and the identification information. In accordance with a concrete procedure, the printing control apparatus makes an inquiry to the resource storage unit, so as to specify the printer that satisfies the geographical condition of the printer of interest and cause the specified printer to carry out printing. In the arrangement that all the printing control apparatuses individually manage the positional information representing the geographical positions of the respective printers on the network, the respective printing apparatuses execute somewhat overlapping management. It is accordingly practical to use a special resource management unit, for example, a directory service provider, for management of the resources.

The technique of the present invention may also be actualized by a printing system that utilizes the directory service. The present invention is thus directed to a printing system, which includes at least one printer connected via a network, a printing control apparatus that is capable of data transmission to and from the at least one printer and outputs print data via the network, so as to cause a printer selected out of the at least one printer to carry out printing, and a directory service provider apparatus that stores information with regard to equipment connected to the network. The directory service provider apparatus has a storage unit that stores therein a table, which represents a mapping of positional information representing a geographical position of each of the at least one printer connected to the network to identification information used to identify the each printer on the network. The printing control apparatus includes: a printer specification unit that receives an input of a geographical condition of a printer of interest that is to be selected to carry out printing, makes an inquiry to the directory service provider apparatus based on the input geographical condition, and specifies a printer, to which the print data are to be output; and a print data output unit that outputs the print data to the specified printer via the network.

The present invention is also actualized as a method of printing, which corresponds to the printing system discussed above. The present invention is accordingly directed to a method of carrying out a printing operation in a printing system, which includes at least one printer connected via a network, a printing control apparatus that is capable of data transmission to and from the at least one printer and outputs print data via the network, so as to cause a printer selected out of the at least one printer to carry out printing, and a directory service provider apparatus that stores information representing equipment connected to the network. The method includes the steps of: storing a table into the directory service provider apparatus, the table representing a mapping of positional information representing a geographical position of each of the at least one printer connected to the network to identification information used to identify the each printer on the network; and causing the printing control apparatus to receive an input of a geographical condition of a printer of interest that is to be selected to carry out printing, to make an inquiry to the directory service provider apparatus based on the input geographical condition, to specify a printer, to which the print data are to be output, based on a result of the inquiry, and to output the print data to the specified printer via the network.

In the printing system and the corresponding method, the printing control apparatus utilizes the directory service and thus readily specifies the printer, to which the print data are to be output, even in the large-scaled network system. The directory service provider apparatus detects the connection of each printer to the network and obtains the positional information representing the geographical position of the printer. The printer newly connected to the network requires an address on the network. The directory service provider apparatus may accordingly detect and register the printer at a timing when an IP address is allocated in TCP/IP.

The printing operation is generally required with a diversity of operations. The special printing control apparatus is thus not present alone. A variety of application programs are generally executed on the computer to carry out printing. In this case, the computer that is in charge of the printing operation is the printing control apparatus. The computer itself is a general-purpose apparatus, and each application program may include an original program for printing. The program for actualizing the functions of the printing control apparatus may be provided individually for each application program or given in the form of a printer driver incorporated in the operating system. In any case, the technique of the present invention is actualized in the form of a recording medium, in which a program for printing or a printer driver is recorded.

The present invention is accordingly directed to a computer program product that is stored on a computer usable medium. The computer program product comprises computer readable program means for causing a computer to carry out the functions of transmitting data to and from at least one printer via a network. The program means also causes the computer to carry out the functions of: obtaining positional information representing a geographical position where each of the at least one printer is located, from the each printer via the network; inputting a geographical condition of a printer of interest, which is to be selected to carry out printing, in the process of outputting the print data; specifying a printer, to which the print data are to be output, based on the obtained positional information and the input geographical condition; and outputting the print data to the specified printer via the network.

The computer reads and executes the specific program recorded in the above recording medium, so as to attain the functions of the printing control apparatus discussed above.

The technique of the present invention is not restricted to the printer but may be actualized by a peripheral device, such as a scanner or a modem, which is capable of data transmission via a network. The peripheral device includes: a positioning unit that recognizes positional information representing a geographical position where the peripheral device is located; and a positional information output unit that outputs the recognized positional information representing the geographical position via the network.

The technique of the present invention is also actualized by a controller that utilizes such a peripheral device. The present invention is accordingly directed to a controller that is capable of data transmission to and from at least one peripheral device via a network and carries out input and output of data from and to a peripheral device selected out of the at least one peripheral device. The controller includes: a positional information obtaining unit that obtains positional information representing a geographical position where each of the at least one peripheral device is located; a condition input unit that inputs a geographical condition of a peripheral device of interest, which is selected for the input and output of data into and from the controller; a peripheral device specification unit that specifies a peripheral device, which is to carry out the input and output of data to and from the controller, based on the obtained positional information and the input geographical condition; and a data input-output unit that inputs and output data from and to the specified peripheral device via the network.

These and other objects, features, aspects, and advantages of the present invention will become more apparent from the following detailed description of the preferred embodiment with the accompanying drawings.

BRIEF DESCRIPTION OF THE DRAWINGS

FIG. 3 is a table storing data obtained from the printers PR;

DESCRIPTION OF THE PREFERRED EMBODIMENT

Figure 1:
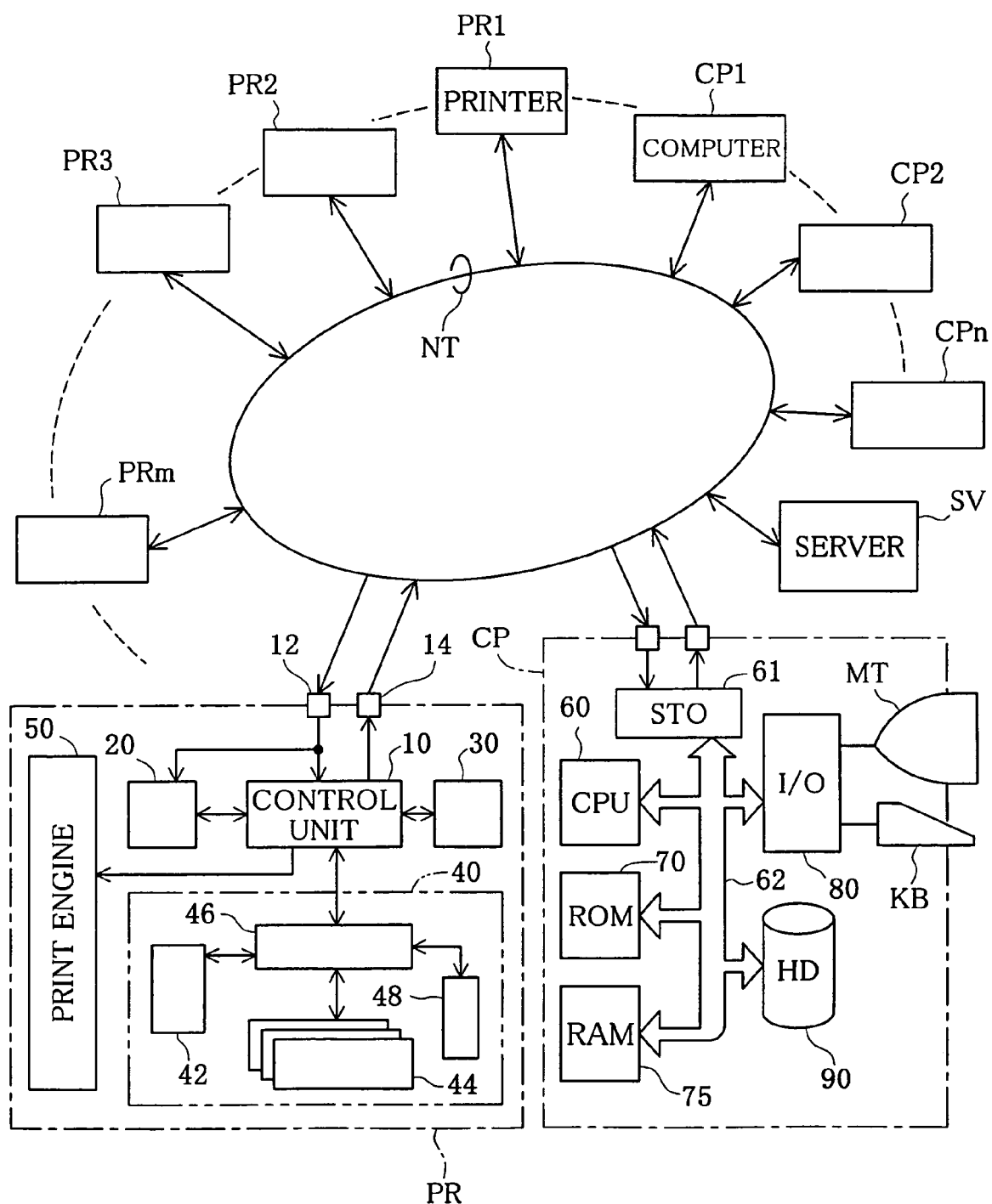
FIG. 1 is a block diagram illustrating a network including printers PR and computers CP in one embodiment according to the present invention.

FIG. 1 is a block diagram illustrating a network NT in one embodiment according to the present invention. The network NT shown in FIG. 1 is formed by a number of computers CP1 through CPn (n is an arbitrary natural number), a number of printers PR1 through PRm (m is an arbitrary natural number), and a network server (hereinafter simply referred to as the server) SV having the functions of a printer server. The server SV manages the computers CP and the printers PR connected to the network NT using IP addresses. Whenever each of the computers CPn and the printers PRm is connected to the network NT with a supply of power, an intrinsic IP address is allocated to the computer CPn or the printer PRm by the server SV. Each computer CPn that requires printing outputs the print data to a desired printer PRm managed by the server SV. The server SV once spools the output print data and successively outputs the print data to the desired printer PRm, so as to cause printing to be carried with the desired printer PRm.

This embodiment regards the network system including the server SV. The technique of the present invention may, however, be applicable to another network system without the server SV that carries out communication according to a rule that the respective devices connected to the network NT output requirements to other devices in a predetermined order (for example, clockwise) based on a certain protocol. One example of such network system utilizes the token ring. The network may have a star-shaped connection formed by connecting a plurality of computers and printers with one server.

Each of the printers PR connected to the network NT includes a control unit 10 as well as a data storage unit 20, a command analyzer unit 30, a positioning unit 40, and a print engine 50 that are controlled by the control unit 10. Data input from the network NT via an input port 12 are stored in the data storage unit 20. The data stored in the data storage unit 20 are successively read by the control unit 10 and sent to the command analyzer unit 30 for data analysis. The results of the data analysis are returned to the control unit 10. As described later, the control unit 10 controls the print engine 50 that actually carries out printing, based on the results of the data analysis. The control unit 10 also outputs positional information representing a geographical position of the printer PR stored in the positioning unit 40 to the network NT via an output port 14.

The positioning unit 40 of the embodiment includes an input-output unit 42 that is a touch-panel liquid-crystal display, a map information storage unit 44 that stores area maps and detailed maps in the respective areas, a positioning control unit 46 that reads map information from the map information storage unit 44 in response to an input from the input-output unit 42 and causes a map corresponding to the map information to be displayed on the input-output unit 42, and a position storage unit 48 that keeps storing the positional information input from the positioning control unit 46 even after the power of the printer PR is turned off.

When the user touches the touch-panel display and specifies a desired division in an area map displayed on the liquid-crystal display of the input-output unit 42, a detailed map corresponding to the desired division is subsequently displayed on the liquid-crystal display. The user touches a desired position on the most detailed map. The desired position is then stored as an installation position of the printer PR. The details of this processing will be discussed later.

Each of the computers CP connected to the network NT has a general configuration and includes a CPU 60 that executes logical operations, a ROM 70 that stores programs and other information in a non-volatile manner, a RAM 75 that functions as a main storage device of the CPU 60, an input-output interface 80 that is in charge of inputs and outputs from and to external devices, such as a keyboard KB and a monitor MT, and a hard disk 90 that functions as an external storage device. These elements are mutually connected via a bus 62. An operating system and a printer driver are stored in the hard disk 90. The printer driver is incorporated into the operating system and extended on the RAM when electric power is supplied to activate the operating system. The processing of reading the positional information stored in the position storage unit 48 of the printer PR is actualized by one function of the printer driver. An application program calls the printer driver and outputs print data to an arbitrary printer PR connected to the network NT.

In the structure of the embodiment, required programs are stored in the hard disk 90, which corresponds to a recording medium. The programs may, however, be stored in flexible disks or CD-ROMs and read into the computer CP for execution.

Figure 2:
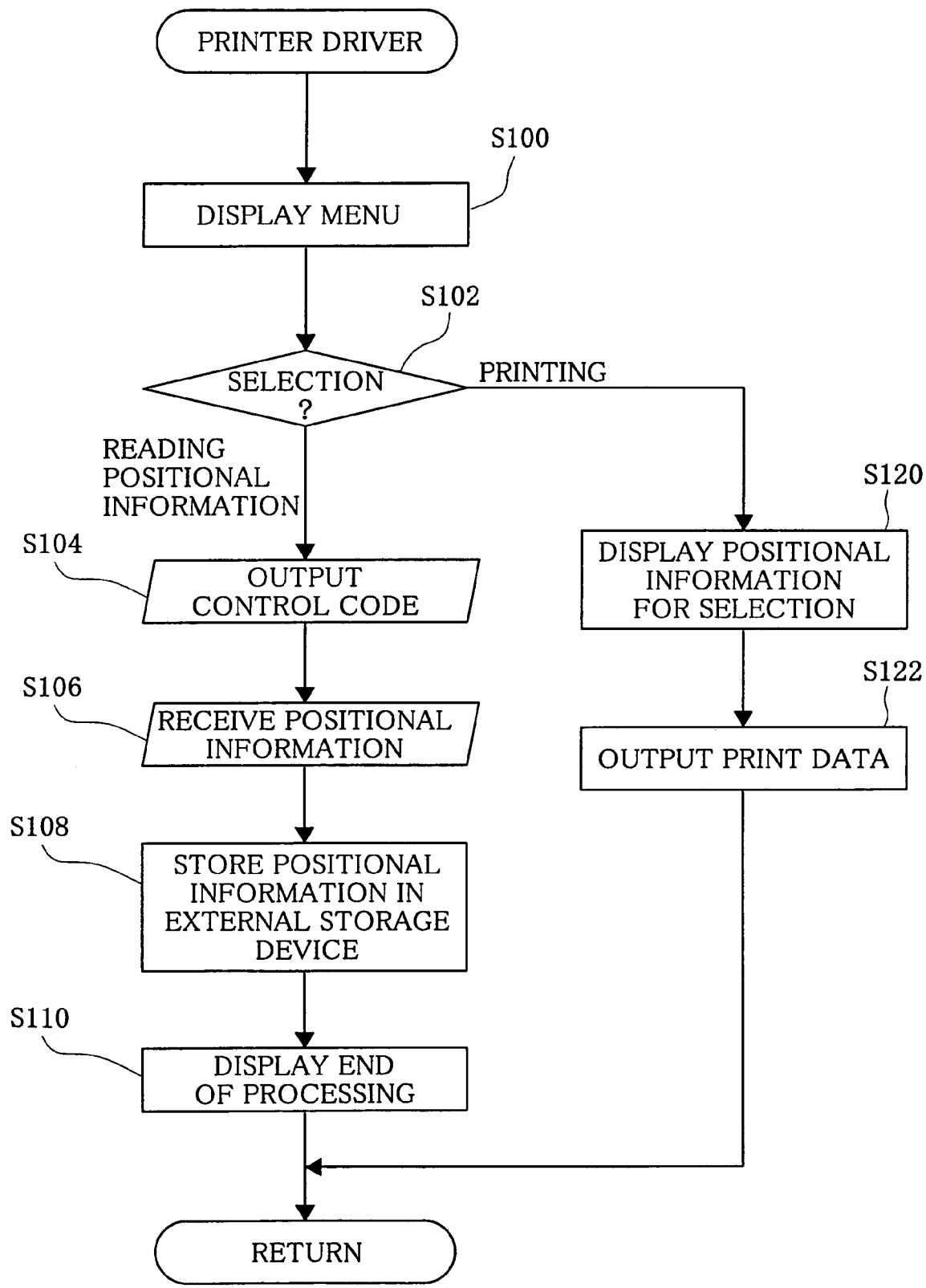
FIG. 2 is a flowchart showing a series of the processing executed by the computer CP.

The following describes a series of the processing carried out when the computer CP requires a printing operation and reads out the printer driver. FIG. 2 is a flowchart showing the functions carried out by the printer driver. When the computer CP requires a printing operation and activates the printer driver, the CPU 60 first causes a menu to be displayed on the monitor MT at step S100. The menu enables the operator of the computer CP to select a desired process out of a plurality of options, for example, a process of reading out the positional information stored in the position storage unit 48 of each printer PR connected to the network NT or a process of transmitting print data to the printer PRm having specific positional information. The operator of the computer CP selects a desired option out of the menu displayed on the monitor MT with an input device, for example, the keyboard KB or a mouse (not shown) at step S102. A series of the processing is then executed corresponding to the selected option in the menu.

Here it is assumed that the process of reading out the positional information stored in the position storage unit 48 of each printer PR connected to the network NT is selected as the desired option. In this case, the CPU 60 outputs a specific control code allocated to the process of reading out the positional information to the network NT at step S104 and receives responses from the respective printers PR at step S106. As described later, when the specific control code output from the computer CP is input into each printer PRm, the control unit 10 of each printer PRm outputs the positional information stored in the position storage unit 48 to the network NT. The CPU 60 of the computer CP that gives the requirement stores the positional information, which is transmitted from the respective printers PR, in the hard disk 90 in the form of a table at step S108. The CPU 60 then informs the operator of the computer CP that the series of the processing is completed at step S110 and exits from this routine.

Intrinsic IP addresses have been allocated to the respective printers PR on the network NT. Each printer PRm accordingly transmits an identification name given to the printer PRm, the PI address of the printer PRm, and positional information AD representing the geographical position of the printer PRm, in response to a requirement from the computer CP. The computer CP stores the information transmitted from the respective printers PR in the form of a table. FIG. 3 shows an example of the table. The positional information includes a code GX that identifies an area map, a division code CR that identifies a detailed map in the selected area map, and coordinates (x,y) that represent a plane position in the selected detailed map. The format of the positional information representing the geographical position will be discussed later. The positional information may alternatively be a combination of a latitude and a longitude. In the case where a positioning system, such as a GPS (global positioning system), is utilized, the combination of a latitude and a longitude is preferable as the positional information.

When the process of transmitting print data is selected as the desired option in the menu displayed through the activation of the printer driver at step S102, the CPU 60 reads out the positional information of the respective printers PR stored in the form of the table in the external storage device or hard disk 90 and causes the positional information to be displayed on the monitor MT for selection of a desired printer PRm at step S120. The positional information of the number of printers (m printers in this embodiment) may be displayed in the form of the table as shown in FIG. 3, or may alternatively be displayed on a map. In an example of FIG. 4, an area map MP1 in the vicinity of the computer CP that requires printing is displayed in several divisions (concretely 4×4 divisions). When the operator of the computer CP clicks on a desired division in the area map MP1, an enlarged view MP2 of the desired division is displayed. The positions of available printers PRi (shown by the open circles) are also displayed on the enlarged view MP2. One preferable application displays a default printer in a different form (shown by the double circle in the example of FIG. 4). It is also desirable that the computer CP that is supposed to carry out printing is displayed in a distinctive manner (shown by the closed star in the example of FIG. 4). A variety of methods are applicable for the display. One method shows the number of printers PR, which are located in the area map in the vicinity of the computer CP that requires printing, by a variation in hue, a variation in color density, or a variation in numeral. When a specific division is selected in the area map, the method displays the detailed positions of available printers PR in the specific division with a detailed map of the specific division. Another method displays the printer PR used for the previous printing operation as a default. Still another method displays the positional information as an address. The operator of the computer CP may select plural pieces of positional information simultaneously, instead of selecting only one piece of positional information.

Figure 4:
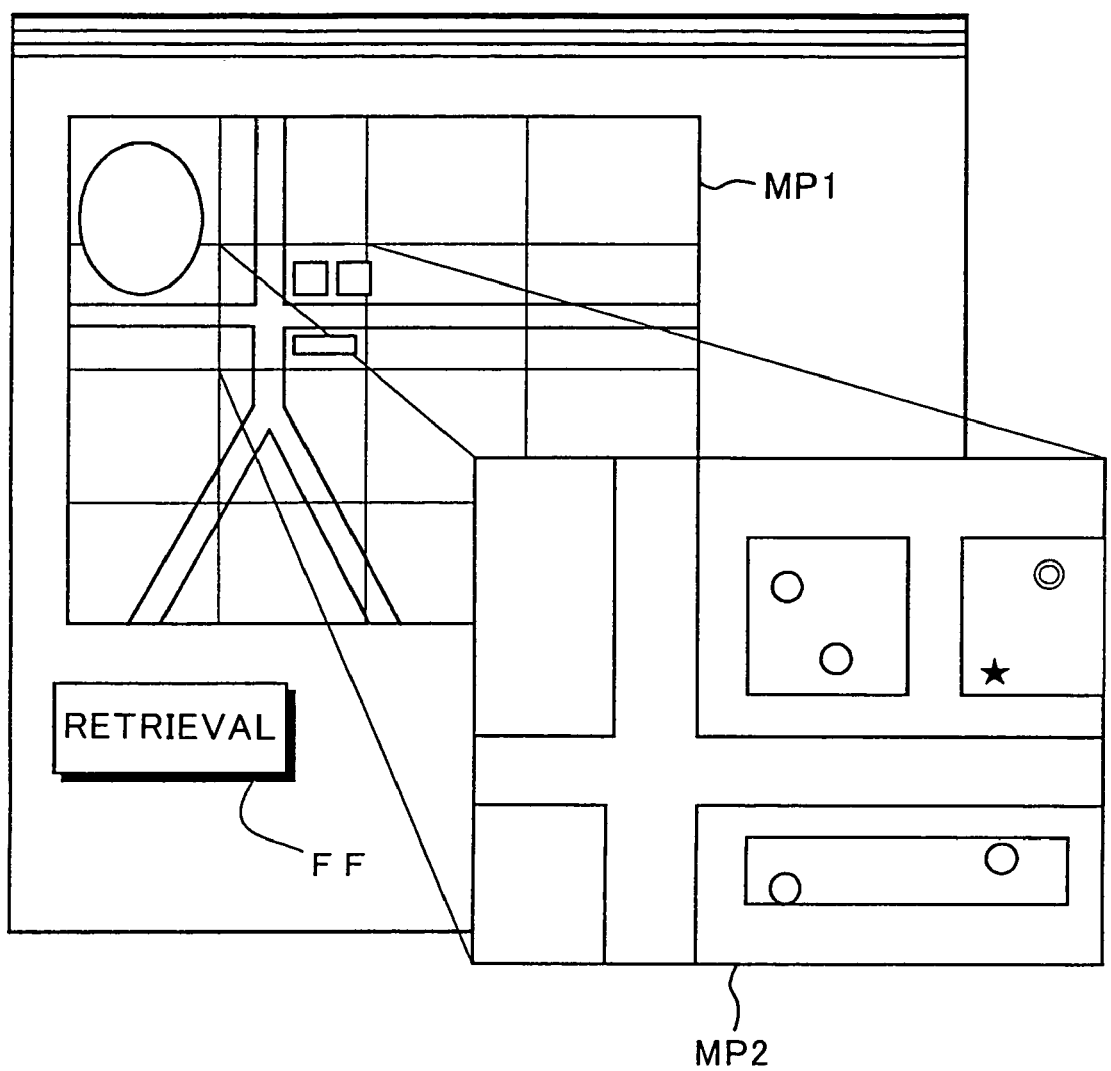
FIG. 4 shows positions of printers PR on a map.
Figure 5:
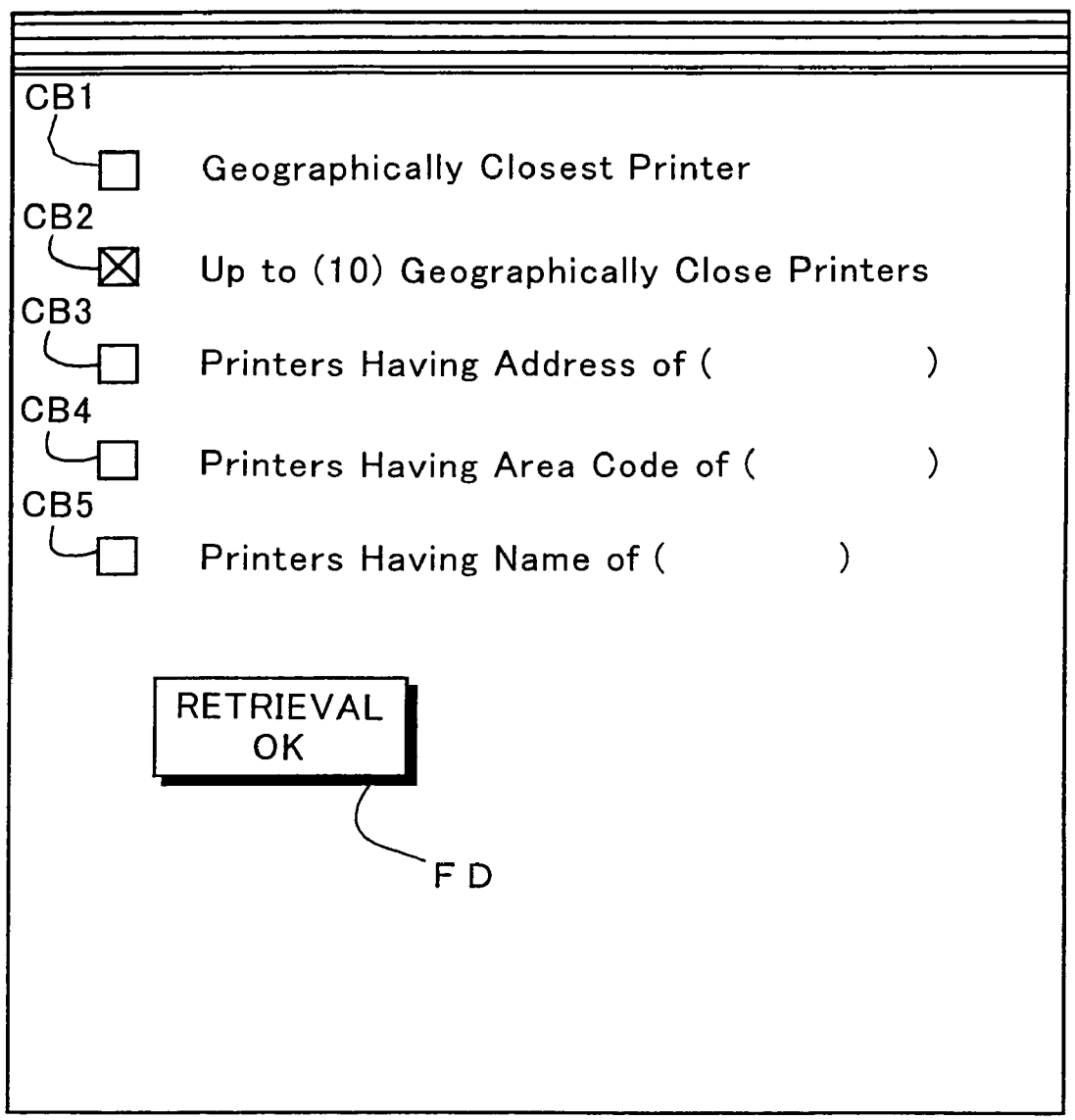
FIG. 5 shows an exemplified window for retrieval of available printers.

The window set for the display of the positional information and the selection has a 'Retrieval' button FF. A click on the 'Retrieval' button FF opens a retrieval dialog box for retrieving the positional information representing the geographical position based on a diversity of conditions. FIG. 5 shows an example of the retrieval dialog box. For the purpose of retrieval, several options are displayed; for example, 'the geographically closest printer', 'up to AA geographically close printers', 'printers having an address of BBB', 'printers in a district having an area code of CCC', and 'printers having a name of DDD'. The operator of the computer CP clicks on appropriate checkboxes CB1 through CB5 to specify selected options as retrieval conditions. For the retrieval based on the address or the area code, the operator enters appropriate data in the corresponding text box and clicks on a 'Retrieval OK' button FD. The operator may click on only one or a plurality of checkboxes CBi. In the case where the plurality of checkboxes CBi are clicked, the retrieval is carried out according to the logical product (AND) of the selected retrieval conditions. Another option may be provided to allow retrieval according to the logical sum (OR) of the plurality of selected retrieval conditions. On completion of the retrieval, one or a plurality of printers satisfying the condition are displayed. The results of the retrieval may be displayed in the form of a map as shown in FIG. 4 or in the form of a table as shown in FIG. 3. The operator of the computer CP eventually selects one printer of interest, which actually carries out printing, out of one or a plurality of printers PR displayed in the above manner and causes the selected printer to start printing. One modified procedure may cause any arbitrary printer included in a plurality of available printers PR displayed to carry out printing, in the case where no specific printer PRm is selected out of the plurality of printers PR.

After the selection of the positional information regarding the desired printer PRm, the computer CP adds the IP address of the selected printer PRm to print data, which is subjected to the current printing process, so as to generate final data and outputs the final data to the network NT at step S122. The program then exits from this routine. In this manner, the print data are output to the selected printer PR on the network NT. In accordance with a general procedure, not each computer CPn but the printer server SV changes the print data into a packet form using the IP address. The print data are once spooled in the server SV, changed into a packet form using the IP address, and then successively output onto the network NT.

Figure 6:
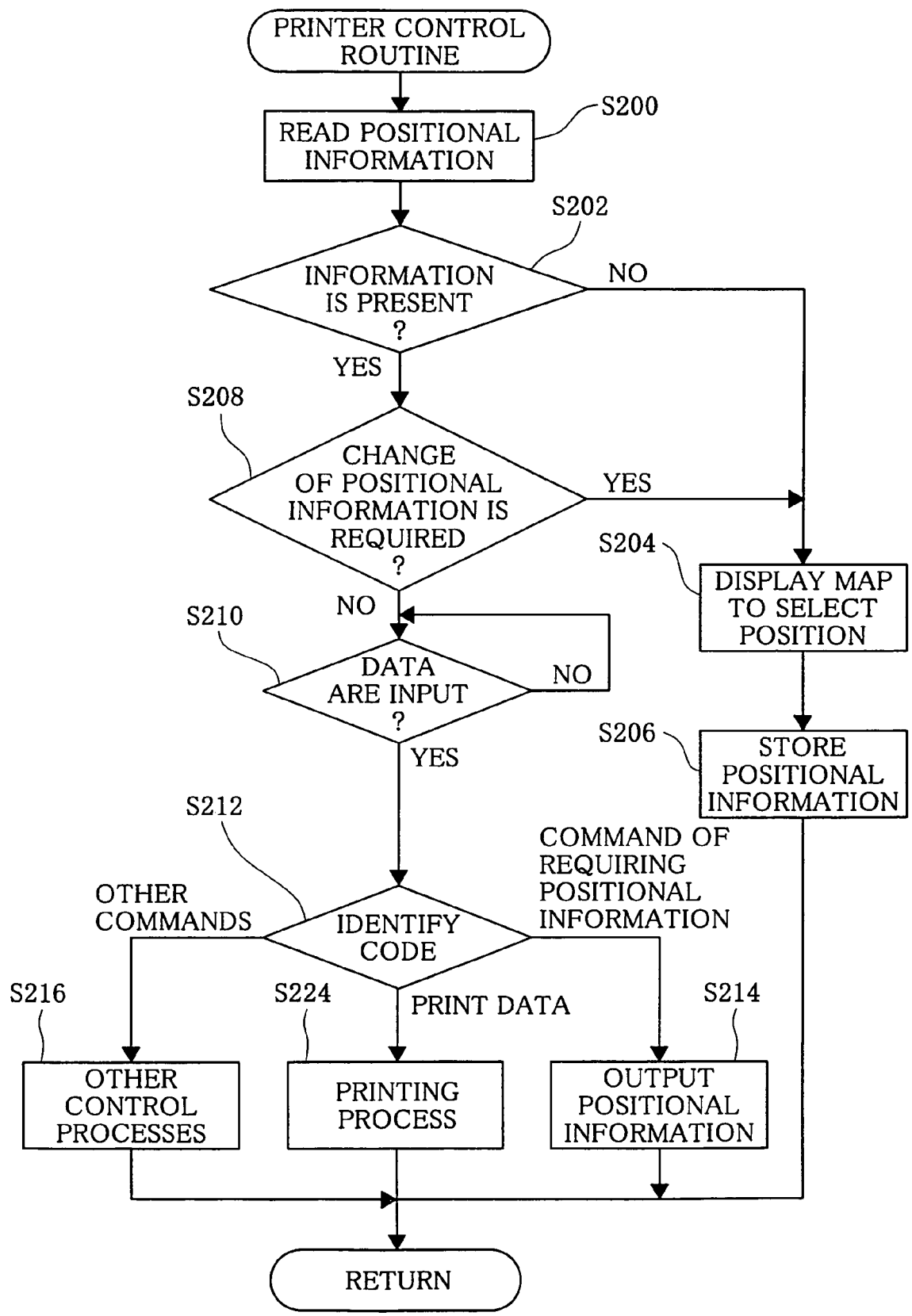
FIG. 6 is a flowchart showing a series of the processing executed by the printer PR.

In response to the series of the processing executed by the computer CP discussed above, each printer PR connected to the network NT carries out a series of the processing shown in the flowchart of FIG. 6. With a supply of electric power, the control unit 10 of the printer PR first reads out the contents of the position storage unit 48 of the positioning unit 40 at step S200. The control unit 10 then refers to the contents and determines whether or not the effective positional information is stored in the position storage unit 48 at step S202. No positional information is set in the printer PR at the time of the shipment from the manufacturer. The position storage unit 48 is accordingly empty at that time. When it is determined that no effective positional information is stored in the position storage unit 48, for example, at the time immediately after the shipment, the program proceeds to a process of storing the positional information at steps S204 and S206.

At step S204, the positioning control unit 46 reads the map information from the map information storage unit 44 and causes a map corresponding to the map information to be displayed on the input-output unit 42 for selection of an appropriate position on the map. In accordance with a concrete procedure, the positioning control unit 46 causes an area map stored in the map information storage unit 44 to be displayed on the input-output unit 42. When the user touches the input-output unit 42, for example, with a finger, to select a specific division, a detailed map of the specific division is then displayed on the input-output unit 42. When the user further selects a certain position on the detailed map, the dialog box shows the selected position in the form of a text, for example, by an address and asks the user whether or not the selected position is to be set to the positional information. This series of the processing is not directly executed by the control unit 10 of the printer PR but is carried out in the positioning unit 40. This is because there are a diversity of arrangements applicable for the positioning unit 40 and different methods are applied to settle the positional information according to the arrangements. After the settlement of the positional information, the positional information is stored in a non-volatile manner in the position storage unit 48 at step S206.

In the case where the effective positional information is stored in the position storage unit 48, that is, once the positional information representing the position of the printer PR has been set in the position storage unit 48, the decision gives an affirmative answer at step S202. The control unit 10 then displays a window to ask the user whether or not a change of the positional information is required at step S208. Every time the position of the printer PR is changed, the positional information once set in the printer PR should be set over again for a change. When the user selects the process of changing the positional information, the program executes the processing of and after step S204 discussed above for the display of the map information and the selection of a new position.

When the positional information has already been set in the position storage unit 48 and no change of the positional information is required, the program proceeds to step S210 to stand by for an input of data via the input port 12. In response to an input of data via the input port 12, the control unit 10 reads the input data, stores the input data into the data storage unit 20, successively reads out the data stored in the data storage unit 20, and sends the data to the command analyzer unit 30 for data analysis at step S212. The command analyzer unit 30 analyzes an input code to specify a command corresponding to the input code. When the input code is a specific control code showing that one of the computers CP connected to the network NT requests the positional information, the control unit 10 activates the positioning control unit 46 to obtain the positional information stored in the position storage unit 48 and outputs the obtained positional information to the network NT via the output port 14 at step S214.

The code input from the network NT is not restricted to the control code requesting the positional information but may be any other control code, for example, a control code that request the status of the printer PR. When the command analyzer unit 30 determines that the input code is any of such other control codes, the control unit 10 carries out the required processing in response to the analyzed command at step S216. When the command analyzer unit 30 determines that the input code is not any command code but represents print data, the control unit 10 activates the print engine 50 to carry out printing with the input print data at step S224.

In the network NT of the embodiment including the plurality of printers PR and the plurality of computer CP discussed above, each printer PRm stores the positional information representing its own position and outputs the positional information to the computer CP connected via the network NT in response to a requirement. This arrangement does not require the network manager to manage the positional information representing the geographical positions of the respective printers PR. When the geographical position of the printer PR is changed, the printer PR sets the new geographical position therein and outputs the own positional information in response to an inquiry from the computer CP. The computer CP, which requires printing via the network NT, obtains the positional information with regard to the available printers PR on the network NT, displays a list of the positional information, and enables the operator to select a desired printer PR for the printing operation.

The arrangement of the embodiment does not require any troublesome procedure, for example, applying the manager of the network NT for the installation position of the printer PR or registering the positional information in the database of the filer server. When the user simply specifies a position to output resulting prints, the printing operation is carried out with a printer PR installed at the specified position.

There is an option 'the geographically closest printer' for the selection. The user is thus not required to find the printer PR closest to the computer CP that requires printing. The printer PR itself stores the positional information representing its own geographical position and outputs the positional information via the network NT. This arrangement enables the network NT to be immediately informed of a change of the installation position of the printer PR. In the process of selection of a desired printer prior to the actual printing operation (step S120 in the flowchart of FIG. 2), the desired printer may be specified by the address or the telephone number. This option enables the printing operation to be carried out, for example, with a printer installed in a convenience store.

The positioning unit 40 of the embodiment includes the input-output unit 42 and the map information storage unit 44 to allow the installation position of the printer PR to be input as a certain location on the map in a visually and intuitively recognizable manner. This arrangement facilitates the updating of the positional information when the installation position of the printer PR is changed.

Figure 7:
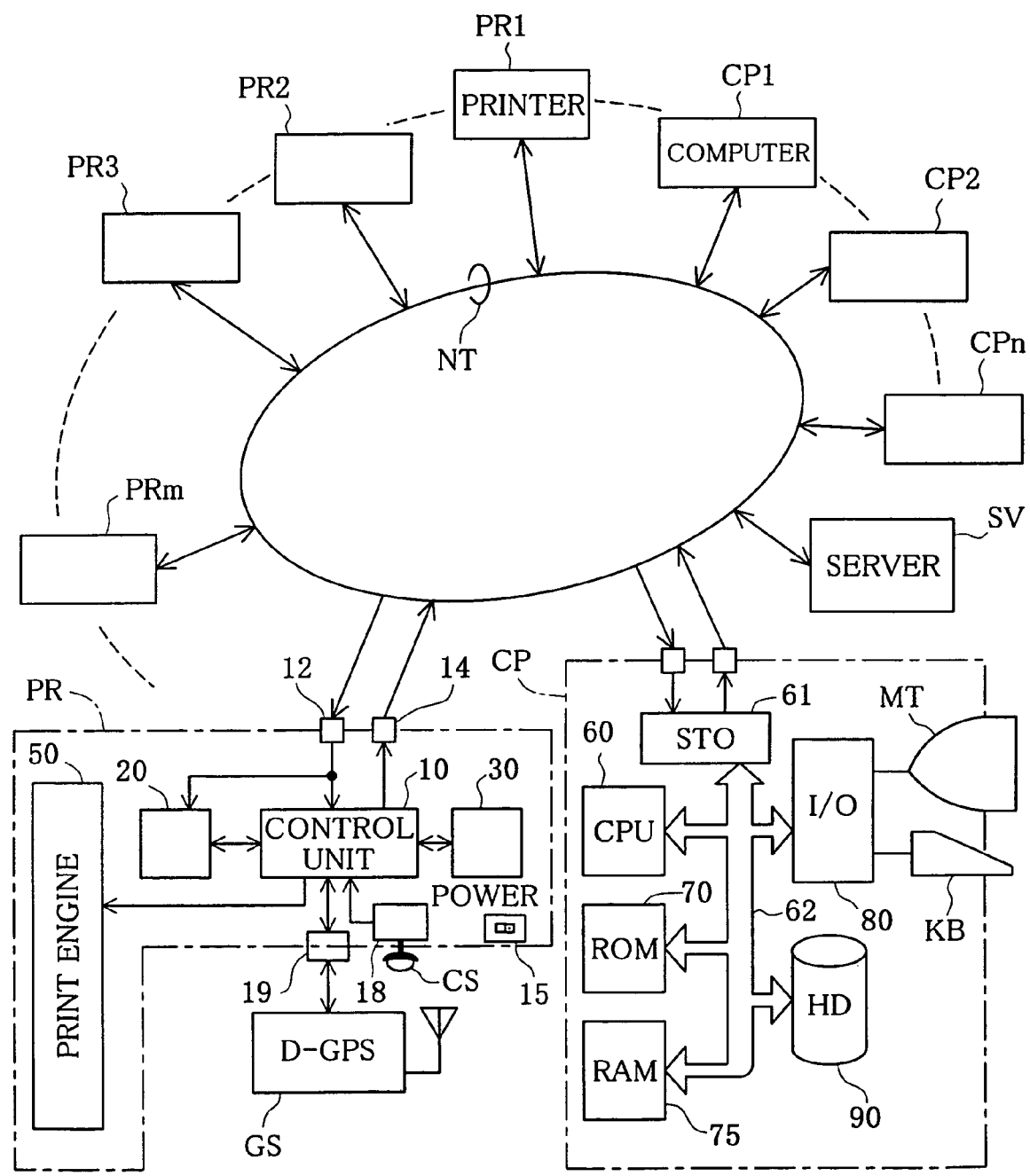
FIG. 7 is a block diagram illustrating another network including another positioning mechanism in place of the positioning unit 40 shown in FIG. 1.

The positioning unit 40 in the printer PR independently carries out the process of positioning the printer PR. Another structure may thus be applied for the positioning unit. For example, a D-GPS positioning system GS may be connected to the printer PR integrally or temporarily as shown in FIG. 7, in place of the input-output unit 42 and the map information storage unit 44 included in the positioning unit 40. This structure automatically obtains the positional information representing the installation position of the printer PR and does not require any specific operation for updating the installation position of the printer PR even if the printer PR is moved. In this modified structure, the positional information representing the geographical position is acquired as absolute positional information defined by the latitude and the longitude. This arrangement enables the user to easily specify a printer PR of interest even when the user is unfamiliar with a district. No special labor is thus required for the user to find an available printer for printing at a destination of a business trip or any trip. The D-GPS positioning system GS continuously receives the radio waves from at least three satellites to update the positional information representing the geographical position. In the case where the D-GPS positioning system GS receives the radio waves from at least four satellites, positioning is carried out in a three-dimensional manner. In this case, the D-GPS positioning system GS specifies the altitude in addition to the latitude and the longitude and enables the positional relationship to be recognized by considering the altitude, for example, in a skyscraper. The possible error of the GPS positioning system may be corrected with the radio waves from ground stations. The GPS positioning system may be combined with a device that specifies the position by taking advantage of the mobile communication technique, for example, a personal handy-phone system or a mobile telephone.

Figure 8:
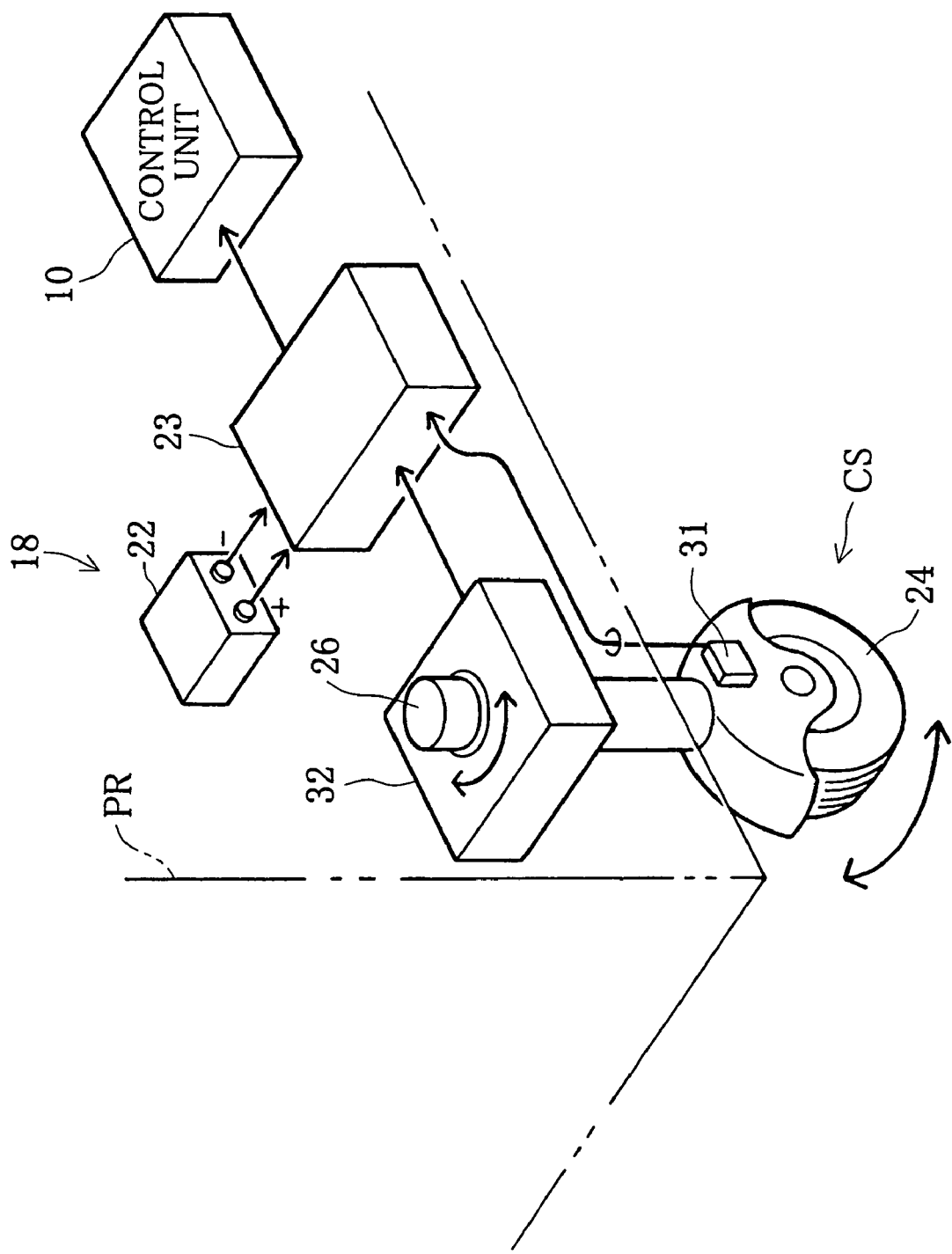
FIG. 8 schematically illustrates the structure of a displacement detection device 18 incorporated in the printer PR shown in FIG. 7.

The following describes the method of updating the positional information in this modified structure. In the example of FIG. 7, the printer PR has a power switch 15, a displacement detection device 18 attached to a caster CS of the printer PR, and a connector 19 to which the D-GPS positioning system GS is connected. As shown in FIG. 8, the displacement detection device 18 includes a battery 22, a one-chip microcomputer 23, a first sensor 31, and a second sensor 32. The first sensor 31 measures the number of rotations of a wheel 24 of the caster CS. The second sensor 32 measures the rotational angle of a swivel shaft 26 that supports the whole caster CS in a freely rotatable manner. The displacement detection device 18 works with the battery 22 as the power source and continuously measures the number of rotations and the rotating direction of the caster CS to monitor the displacement of the printer PR, even while the power of the printer PR is off. Namely the displacement detection device 18 attached to the caster CS monitors the displacement of the printer PR even when the printer PR is moved with the power of the printer PR kept off.

Figure 9A:
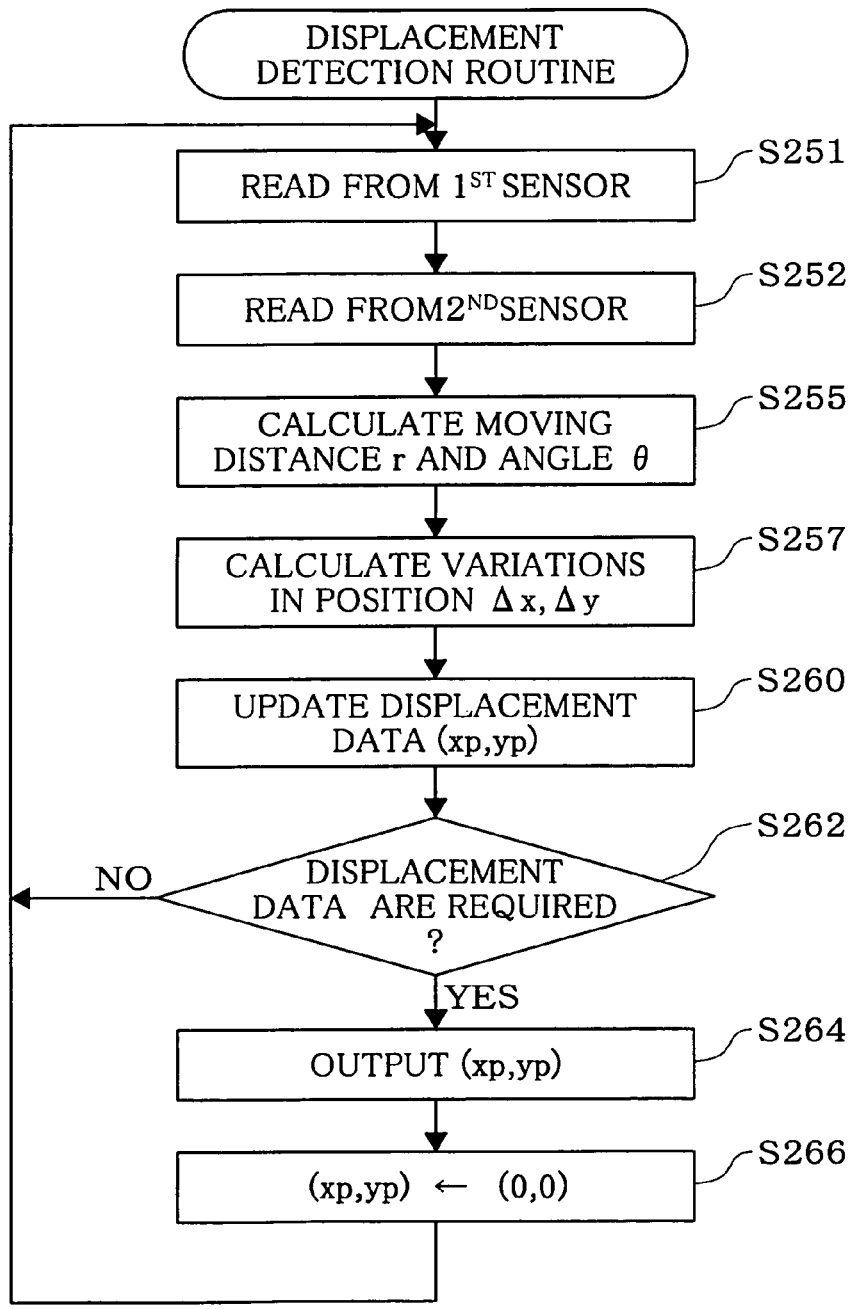
FIG. 9A is a flowchart showing a series of the processing executed by a one-chip microcomputer 23 included in the displacement detection device 18.
Figure 9B:
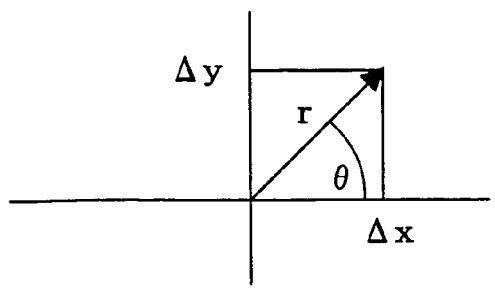
FIG. 9B is an illustration to show a condition of conversion of coordinate system.

FIG. 9A is a flowchart showing a series of the processing executed by the one-chip microcomputer 23 included in the displacement detection device 18. When the program enters the routine of FIG. 9, the microcomputer 23 respectively reads signals from the first sensor 31 and the second sensor 32 at steps S251 and S252, and calculates a moving distance r and an angle θ at step S255. The microcomputer 23 then calculates variations in position Δx and Δy in an X-Y coordinates system from the moving distance r and the angle θ at step S257. The calculation is based on the following relations shown in FIG. 9B:

$$\Delta x = r \cdot \cos \theta$$

$$\Delta y = r \cdot \sin \theta$$

The microcomputer 23 subsequently adds the calculated variations in position Δx and Δy to previous displacement data (xp,yp), so as to obtain current displacement data (xp,yp) at step S260. It is then determined whether or not the control unit 10 of the printer PR requests the displacement data at step S262. When it is determined that the control unit 10 of the printer PR requests the displacement data, the microcomputer 23 outputs the updated displacement data (xp,yp) to the control unit 10 at step S264 and resets the displacement data (xp,yp) to zero at step S266. The displacement detection device 18 repeatedly executes the series of the processing discussed above.

Figure 10:
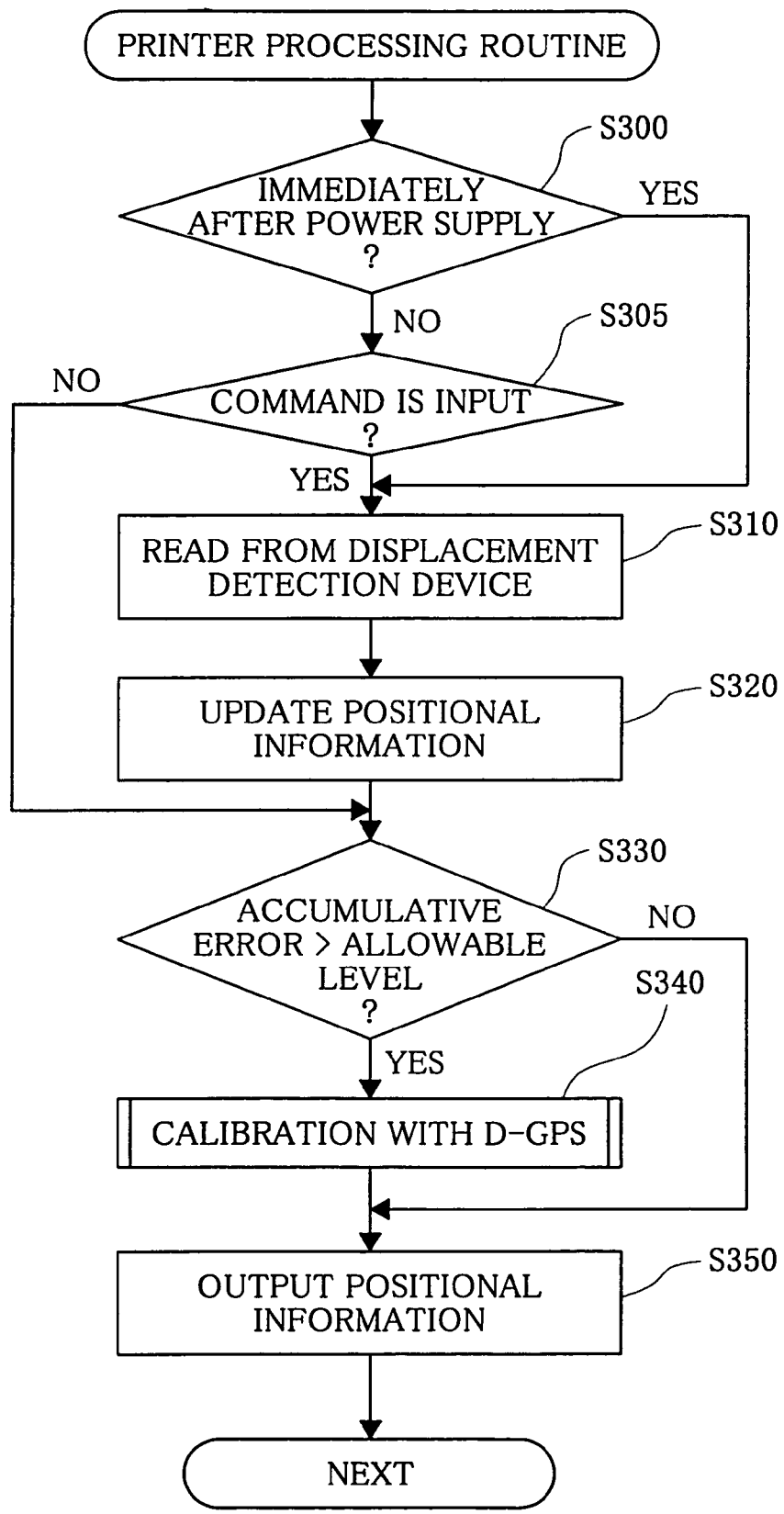
FIG. 10 is a flowchart showing a series of the processing executed by the printer PR shown in FIG. 7.

The printer PR, on the other hand, executes a processing routine shown in the flowchart of FIG. 10. The processing routine of FIG. 10 starts immediately after the power switch 15 is turned on. The control unit 10 of the printer PR first determines whether or not the current moment is immediately after the supply of electric power at step S300. When the current moment is not immediately after the supply of electric power, it is then determined whether or not a command is input to read the positional information via the network NT at step S305. The command to read the positional information via the network NT is output from the computer CP that itself is connected to the network NT and requires printing with the printer PR connected to the network NT. When it is determined at step S300 that the current moment is immediately after the supply of electric power or when it is determined at step S305 that there is a requirement of the positional information, the control unit 10 requires data from the displacement detection device 18 and obtains the current displacement data (xp,yp), which has been updated successively even while the power is off, at step S310. The control unit 10 subsequently updates the positional information stored in the printer PR, based on the current displacement data (xp,yp) at step S320.

After the conclusion of the above series of the processing, it is determined whether or not the accumulative error of the positional information is greater than an allowable level at step S330. The displacement detection device 18 calculates the variations in position Δx and Δy from the number of rotations and the rotating direction of the wheel 24 of the caster CS and updates the displacement data with the calculated variations Δx and Δy. There may be, however, a deviation from the actual displacement data, due to the accuracy of the sensors 31 and 32. The determination of step S330 may accordingly be based on the frequency of the processing that reads the displacement data (xp,yp) from the displacement detection device 18 and updates the positional information stored in the printer PR. When the frequency of the processing exceeds a preset number of times, it is determined at step S330 that the accumulative error of the positional information is greater than the allowable level. In this case, the positional information is corrected with the D-GPS positioning system GS (calibration) at step S340. At this moment, if the D-GPS positioning system GS is not connected with the connector 19, a connecting instruction is given and displayed. When the D-GPS positioning system GS is provided for each printer PR, such decision for the connecting state is not required. The total cost of the system is, however, advantageously reduced when only one D-GPS positioning system GS is provided for one floor or an office and connected with the connector 19 only for the calibration. In the case where the accumulative error is not greater than the allowable level at step S330, the positional information updated at step S320 is output to the network NT at step S350. In the case where the accumulative error is greater than the allowable level at step S330, on the other hand, the positional information corrected with the D-GPS positioning system GS at step S340 is output to the network NT at step S350. The program then exits from this routine. The computer CP, which requires the desired printer PR to carry out printing, obtains the output positional information on the network NT and utilizes the positional information for recognition of the position of the printer PR in a subsequent printing process.

Figure 11:
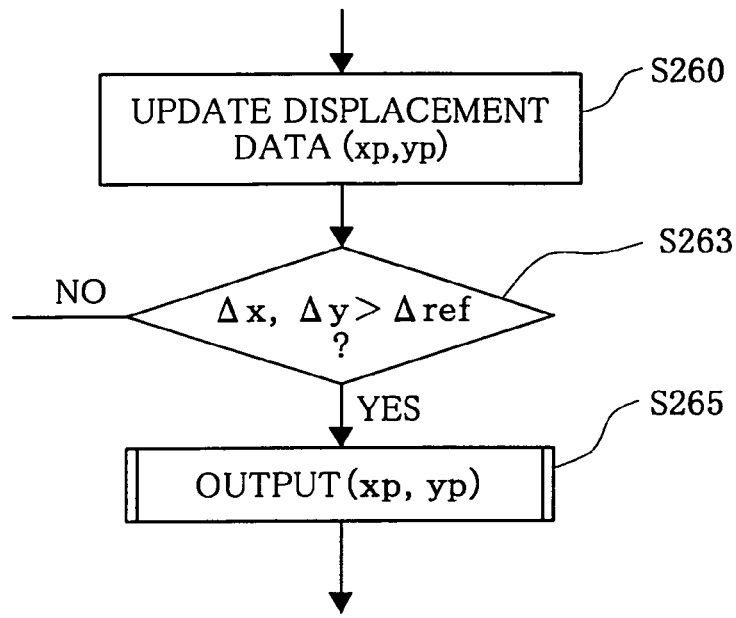
FIG. 11 is a flowchart showing a main part of the processing to update data from the displacement detection device 18.

In the modified example discussed above, the control unit 10 of the printer PR obtains the displacement data from the displacement detection device 18. There is, however, some possibility that the printer PR is moved while keeping connection to the network NT. In a modified procedure shown in the flowchart of FIG. 11, after the displacement data (xp,yp) is updated at step S260, the calculated variations in position Δx and Δy are compared with a predetermined reference value Δref at step S263. When at least one of the calculated variations in position Δx and Δy is greater than the predetermined reference value Δref, the displacement detection device 18 outputs the updated displacement data (xp,yp) at step S265. In this structure, the positional information is updated whenever the printer PR is moved by a predetermined distance. With the recent development of the high-capacity battery and the wireless LAN, the printer PR is sometimes moved while keeping connected to the network NT. This modified arrangement monitors the shift of the printer PR in real time.

Figure 12:
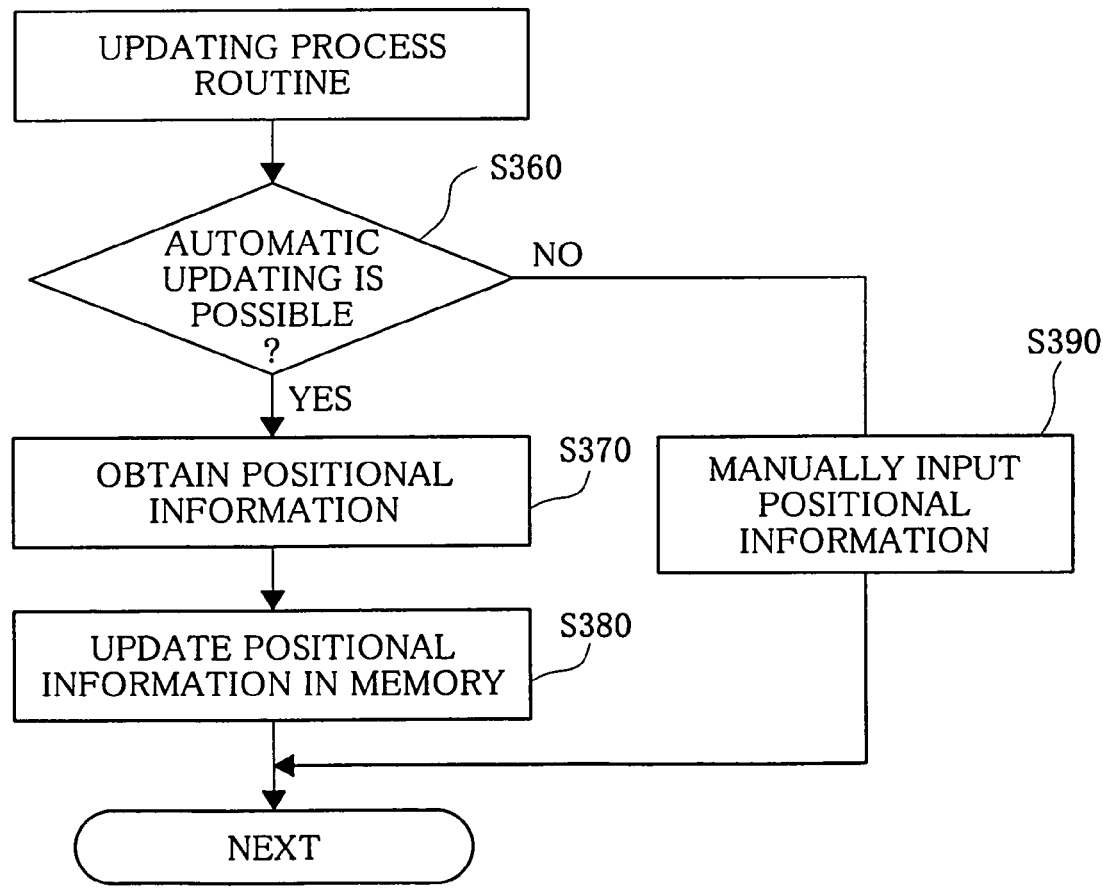
FIG. 12 is a flowchart showing a series of the processing to determine whether or not the automatic updating of the positional information is carried out.

The modified example discussed above uses the displacement detection device 18 to automatically update the positional information, for example, at the time immediately after the supply of electric power. In accordance with another modified procedure shown in the flowchart of FIG. 12, the control unit 10 of the printer PR determines whether or not it is possible to automatically update the positional information at step S360. When it is possible to automatically update the positional information with the displacement detection device 18 and the D-GPS positioning system GS, the control unit 10 obtains the automatically updated positional information using the displacement detection device 18 and the D-GPS positioning system GS at step S370 and stores the updated positional information in a memory of the printer PR (not shown) at step S380. When the automatic updating is not possible, on the other hand, a message for demanding manual updating is displayed on a display panel of the printer PR (not shown) and causes the user to input the positional information representing the geographical position of the printer PR at step S390.

Figure 13:
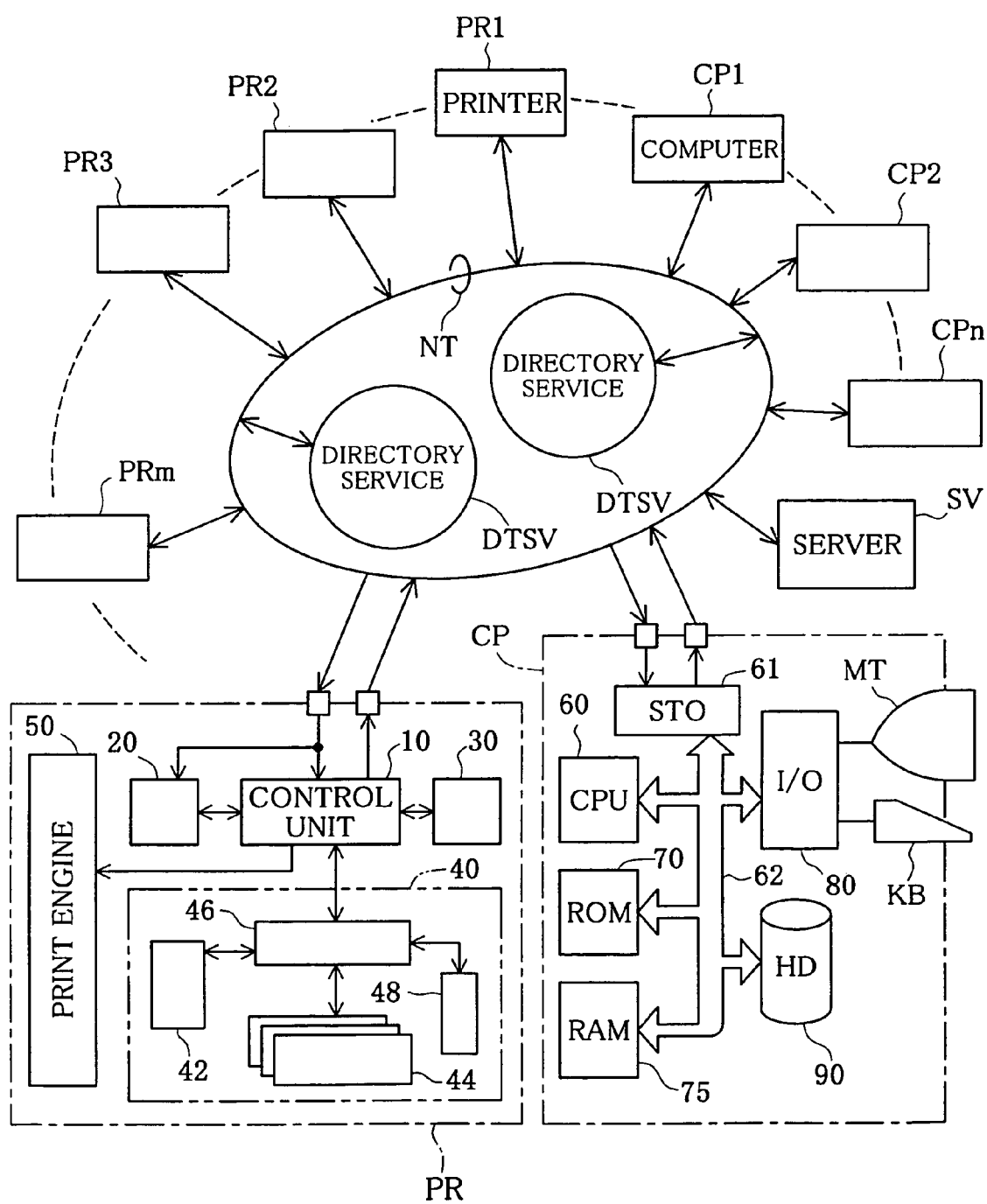
FIG. 13 is a block diagram illustrating a printing system utilizing a directory service.

In the embodiment and its modified example discussed above, the computer CP that requires printing obtains the positional information with regard to each printer PR connected to the network NT according to the requirements and manages the obtained positional information. Another arrangement utilizes a specific apparatus that is located on the network NT and carries out a directory service to manage the respective resources connected to the network NT. For example, in a system shown in FIG. 13, there are several directory services on the network NT. The directory service is generally actualized by a specialized server DTSV. The server DTSV retrieves the respective apparatuses or resources available on the network NT according to a preset schedule and stores the results of the retrieval in the form of a table as shown in FIG. 3. The computer CP asks the directory service the information with regard to printers, obtains the positional information with regard to the currently available printers from the directory service, and causes the user to specify a desired printer. In the system utilizing the directory service, the computer CP does not need to obtain the positional information from the respective printers PR and manage the obtained positional information. This advantageously simplifies the processing executed by the computer CP. Since the respective computers CP share the information with regard to the available printers, the total management by the specialized directory service is preferred to the individual management by the respective computers CP. Each printer PRm still stores its own positional information in this directory service system, so that no excess loading is applied to the directory service.

In the case where the network NT utilizes the positional information representing the geographical position, instead of the IP address, the print data with the positional information representing the geographical position, instead of the IP address, added thereto may be output to the network NT. In this structure, the computer CP does not use any code of alphabets and numerals having the meaning only on the specific network NT, for example, the name, the ID, or the IP address allocated to each printer PR, but utilizes the positional information that intuitively represents the geographical position of the printer PR installed at a desired position for the printing operation, for example, in the form of an address or a map. The computer CP selects the positional information of the desired printer PR and outputs the data including the selected positional information and the print data, which are subject to the printing operation. In this case, each printer PR reads the output data on the network NT, recognizes the positional information included in the output data, and determines whether or not the printer PR is supposed to print the print data included in the output data.

Figure 14:
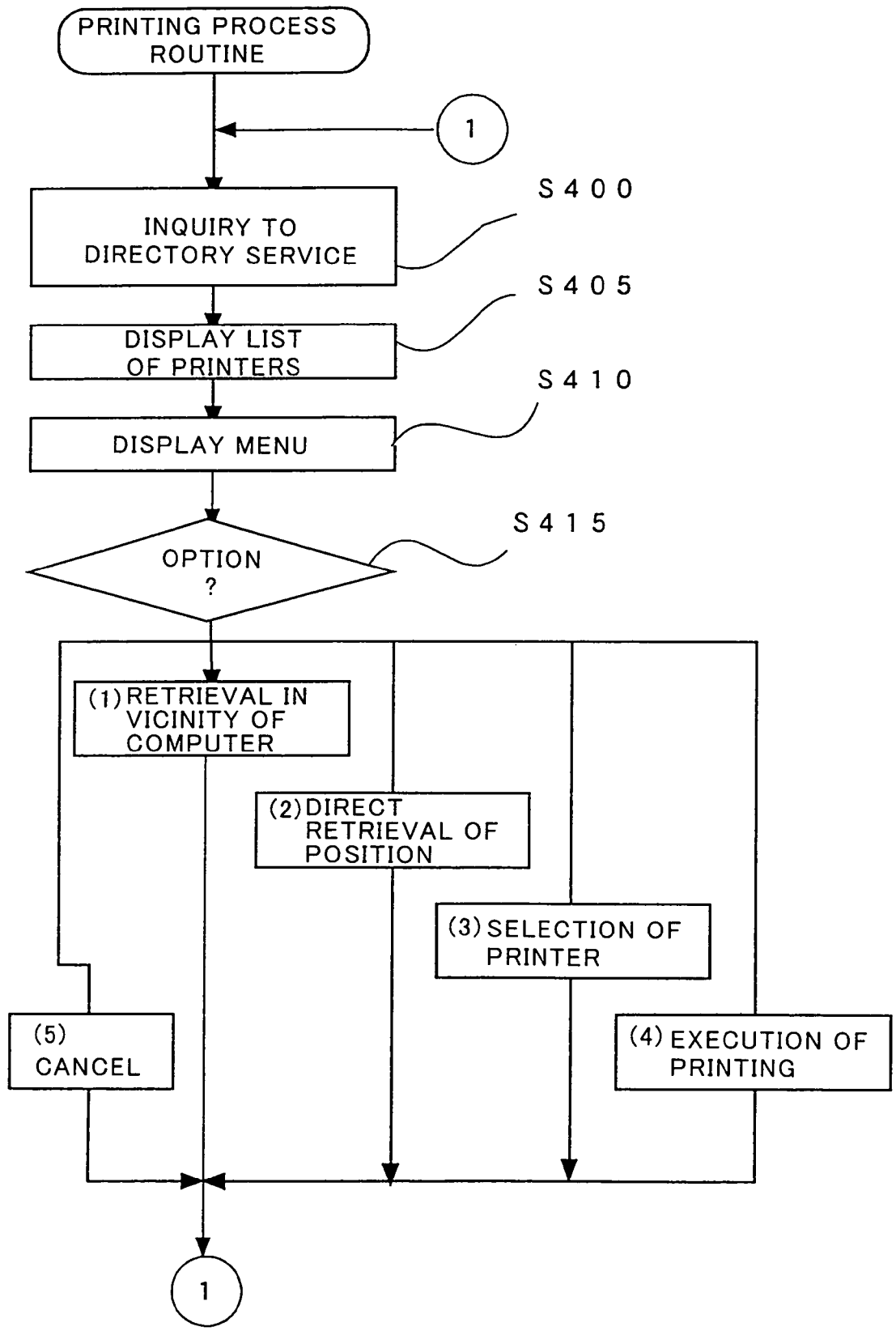
FIG. 14 is a flowchart showing a series of the processing executed by the computer CP in the printing system utilizing the directory service.
Figure 15:
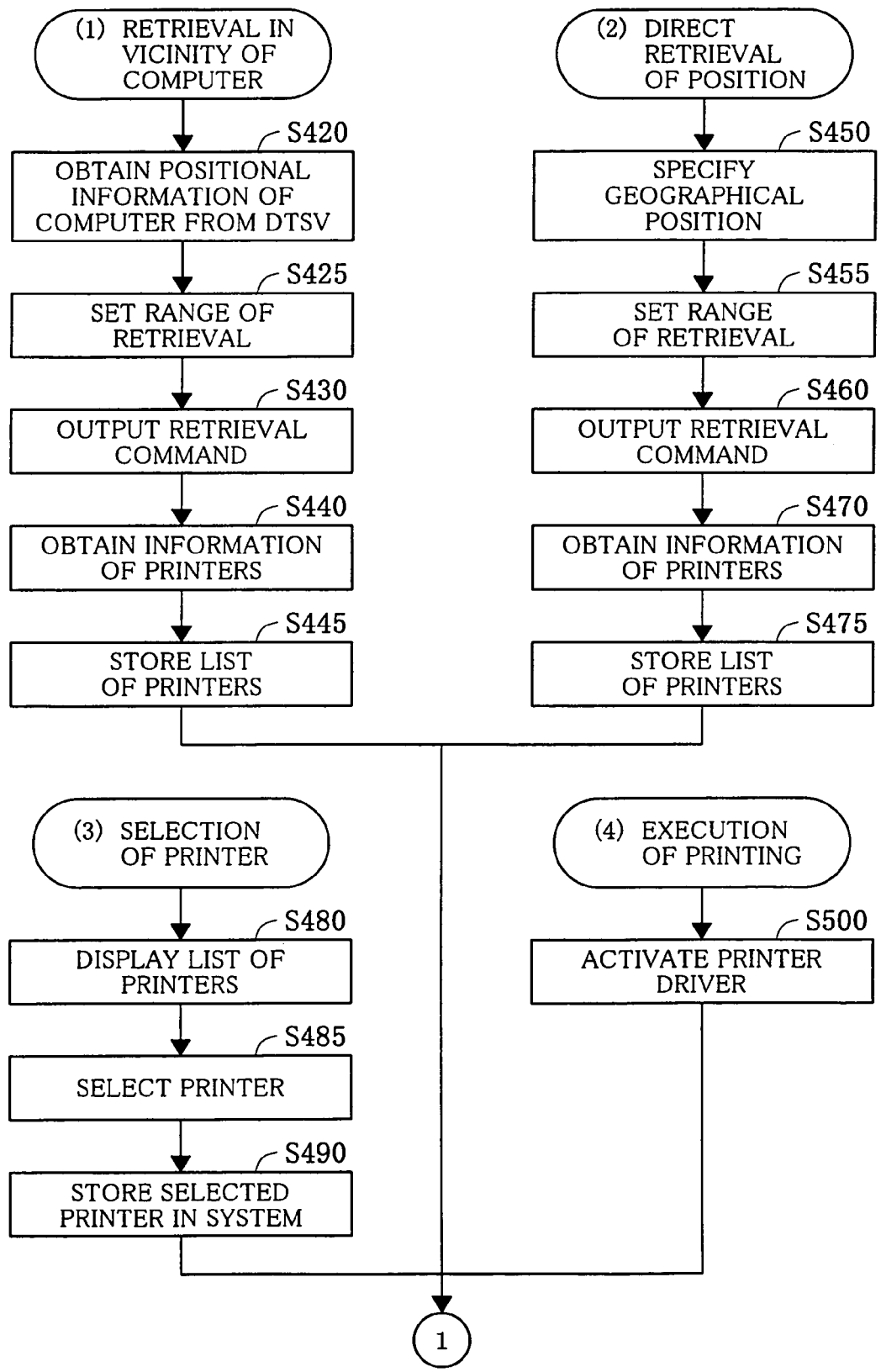
FIG. 15 is a flowchart showing details of the processing in the flowchart of FIG. 14.

In the case of a large-scaled network NT including the servers DTSV for the directory services, the number of printers PR that are the objects of management amounts to several hundreds to even several tens thousands. In this case, the technique of retrieval as shown in FIGS. 4 and 5 is very important. FIGS. 14 and 15 are flowcharts showing a series of the processing carried out in the printing system including a plurality of computers CP, a large number of printers PR, and directory services shown in FIG. 13. The processing includes the retrieval that is executed by the computer CP prior to the actual printing operation. The computer CP, which is connected to the network NT to utilize the directory service and currently requires printing, makes an inquiry to the directory service at step S400 and causes a list of the available printers PR to be displayed on the screen of the monitor MT at step S405. When it is difficult to specify a desired printer PR in the displayed list of the available printers PR, the user opens a menu window having retrieval options at step S410.

The computer CP monitors the user's selection of a desired option in the menu window at step S415 and carries out the required series of the processing in response to the selection. The menu window may be a dialog box as shown in FIG. 5 or may have a hierarchical structure for the successive selection. The menu window may have any form to allow selection. In the example of FIGS. 14 and 15, the options include (1) retrieval in the vicinity of the computer CP, (2) direct retrieval of the positional information, (3) selection of the desired printer PR, (4) execution of the printing operation, and (5) cancel. The details of the processing executed in the respective options are shown in the flowchart of FIG. 15. The following describes the series of the processing executed in the options (1) through (4) with the flowchart of FIG. 15.

(1) Retrieval in the Vicinity of Computer CP

When the program enters this routine, the CPU 60 of the computer CP first obtains the positional information representing the geographical position of the computer CP from the server DTSV for the directory service at step S420. The CPU 60 then specifies an allowable range Rrr as a range of retrieval if not yet specified at step S425. After setting the allowable range Rrr, the computer CP outputs a retrieval command at step S430. The retrieval command includes a parameter for retrieving the printers PR in the vicinity of the computer CP and the specified allowable range Rrr. The server DTSV for the directory service starts retrieving the managing data with regard to the printers PR in response to an input of the retrieval command to find the corresponding printers PR, and obtains and outputs the positional information of the corresponding printers PR at step S440. The computer CP receives a list of the positional information regarding the available printers PR and stores the list in the internal hard disk 90 at step S445. The allowable range may be specified by a physical distance from the computer CP, for example, within 30 meters in radius, or by a time from the computer CP, for example, within 3 minutes. The allowable range may also be within a predetermined distance from a railway or subway station or a bus stop.

(2) Direct Retrieval of Positional Information

The user may select the option of directly retrieving the positional information in the menu window. In this case, the computer CP demands specification of a position, for example, by a combination of 'the north latitude and the east longitude' at step S450 and specification of an allowable range Rrr relative to the specified position at step S455. After setting the allowable range, the computer CP outputs a retrieval command at step S460. The retrieval command includes a parameter corresponding to the positional information to be retrieved and the specified allowable range Rrr. The server DTSV for the directory service starts retrieving the managing data with regard to the printers PR in response to an input of the retrieval command to find the corresponding printers PR, and obtains and outputs the positional information of the corresponding printers PR at step S470. The computer CP receives a list of the positional information regarding the available printers PR and stores the list in the internal hard disk 90 at step S475. The positional information of the printer PR to be retrieved is not restricted to the combination of the latitude and the longitude, but may be defined as 'between P station and Q station along the A railway line' or 'within the area of national fundamental map X' if the directory service permits. Like the option (1) discussed above, the allowable range may be specified by a physical distance from the computer CP, for example, within 30 meters in radius, or by a time from the computer CP, for example, within 3 minutes. The allowable range may also be within a predetermined distance from a railway or subway station or a bus stop.

(3) Selection of Desired Printer PR

When the user selects the option of selecting the desired printer PR, a list of the available printers PR with their positional information stored at step S445 or at step S475 is displayed at step S480. The user selects a desired printer PR for the printing operation out of the displayed list through an operation of the mouse or the keyboard KB at step S485. The selected printer PR is stored in the system as the printer of interest that carries out the printing operation at step S490. The number of copies, the printing density, and the margins may be set after the selection of the desired printer PR.

(4) Execution of Printing Operation

When the user selects the option of executing the printing operation, the printer driver is activated for the printer PR stored in the system at step S490 to carry out the printing operation at step S500. In accordance with a concrete procedure, the printer driver processes the data input from the application program and outputs printable bit-map data to the printer PR stored in the system.

In the printing system where a large number of printers are connected to the network NT or where the installation positions of the available printers range over a wide area, the user can readily specify the desired printer PR for the printing operation by the retrieval utilizing the directory service. The contents of the retrieval depend upon the information managed by the server for the directory service. Each computer CP is accordingly not required to collect and manage the data independently. Once a database is laid in the directory service, the retrieval may be carried out under a desired condition, for example, 'picking the resulting prints up at a convenience store along A street between the home office and the customer's office'. In another example, the user connects the own computer to the network and specifies the geographically closest printer at a remote office which the user is unfamiliar with. In still another example, the retrieval may be carried out under the condition of 'printers in the vicinity of the previously selected printer'.

The present invention is not restricted to the above embodiment or its modifications, but there may be many other modifications, changes, and alterations without departing from the scope or spirit of the main characteristics of the present invention. For example, the peripheral devices connected to the network are not restricted to the printers but may be modems or scanners. Any of these peripheral devices recognizes positional information representing the geographical position where the peripheral device is located and outputs the positional information in response to a requirement from the computer or the directory service. The technique of the present invention is also applicable to a system including a plurality of networks connected to one another via a gateway, as well as to a network management system. The technique of the present invention may be actualized by combining the functions of the embodiment discussed above with a system that automatically orders expendables, such as printing sheets and toners. In the system that automatically orders the expendables via a telephone line or a network, unless the center that receives orders manages the positional information of the peripheral devices that have given the orders, it takes time that the required expendables are delivered to the peripheral devices. The printer or another peripheral device according to the present invention recognizes the positional information representing the geographical position of the printer or the peripheral device and outputs the positional information with the order. This enables construction of a practical ordering system. The technique of the present invention also enables construction of a system that sends a requirement of maintenance with the positional information of the printer to a maintenance section in the case of a trouble, such as paper jamming in the printer. This reduces the labor and time required for the maintenance.

The scope and spirit of the present invention are limited only by the terms of the appended claims.

What is claimed is:

1. A printer that is capable of data transmission via a network and receives print data to carry out printing, said printer comprising:
   a positioning unit that recognizes positional information representative of where said printer is located;
   a decision unit that receives print data, said print data in itself includes the positional information for said printer, wherein said positional information is given as data comprising a combination of a latitude, a longitude, and an altitude, and determines whether said print data are to be printed by said printer, based on the positional information;
   a printing unit that carries out printing with the print data when said decision unit determines that said print data are to be printed by said printer;
   a positional information output unit that outputs said recognized positional information via the network, wherein said positioning unit includes a GPS (global positioning system) configured to obtain said positional information representing where said printer is located by utilizing a phase difference between microwaves sent from at least three satellites.

2. A printer in accordance with claim 1, wherein said positioning unit comprises:
   a positional information input unit that inputs said positional information representing the position where said printer is located; and
   a storage unit in which said positional information input from said positional information input unit is stored.

3. A printer in accordance with claim 1, wherein said positional information output unit comprises:
   an input unit that receives a positioning instruction sent from a specific device via the network; and
   an output unit that outputs said positional information recognized by said positioning unit to said specific device, in response to said positioning instruction.

4. A printer in accordance with claim 1, said printer further comprising:
   a displacement detection unit that detects a displacement of said position of said printer; and
   a positioning activation unit that activates said positioning unit to carry out the recognition of said positional information, in response to a detection of the displacement of the position.

5. A printer in accordance with claim 1, said printer further comprising:
   a power switch for supplying electric power; and
   a positioning activation unit that activates said positioning unit to carry out the recognition of said positional information, in response to a power supply through an operation of said power switch.

6. A printer in accordance with claim 1, said printer further comprising:
   a command input unit that inputs a positioning command from another apparatus via the network; and
   a positioning activation unit that activates said positioning unit to carry out the recognition of said positional information, in response to an input of said command.

7. A printer that is capable of data transmission via a network and receives print data to carry out printing, said printer comprising:
   a positioning unit that recognizes positional information representative of where said printer is located, wherein said positioning unit includes a positional information obtaining unit that obtains said positional information as a result of positioning by a positioning system connected therewith;
   a positional information output unit that outputs said recognized positional information via the network;
   a displacement detection unit that detects a displacement of said position of said printer;
   a positioning activation unit that activates said positioning unit to carry out the recognition of said positional information, in response to a detection of the displacement of the position;
   a decision unit that receives print data, said print data in itself includes the positional information for said printer, wherein said positional information is given as data comprising a combination of a latitude, a longitude, and an altitude, and determines whether said print data are to be printed by said printer, based on the positional information; and
   a sensor that recognizes a moving distance of the printer, wherein said displacement detection unit detects where the printer is located based on the moving distance recognized by the sensor, and
   said positioning system is a GPS (global positioning system) that obtains said positional information by utilizing a phase difference between microwaves sent from at least three satellites.

8. A printer in accordance with claim 7, wherein said positioning unit comprises:
   a positional information input unit that inputs said positional information representative of the position where said printer is located; and
   a storage unit in which said positional information input from said positional information input unit is stored.

9. A printer in accordance with claim 7, wherein said positioning system obtains said positional information representative of the position of said printer by communicating with at least one of plural fixed ground stations.

10. A printer in accordance with claim 7, wherein said positional information output unit comprises:
   an input unit that receives a positioning instruction sent from a specific device via the network; and
   an output unit that outputs said positional information recognized by said positioning unit to said specific device, in response to said positioning instruction.

11. A printer in accordance with claim 7, said printer further comprising:

a power switch for supplying electric power; and a positioning activation unit that activates said positioning unit to carry out the recognition of said positional information, in response to a power supply through an operation of said power switch.

12. A printer in accordance with claim 7, said printer further comprising:

a command input unit that inputs a positioning command from another apparatus via the network; and a positioning activation unit that activates said positioning unit to carry out the recognition of said positional information, in response to an input of said command.

* * * * *